United States Patent [19]

Kortge

[11] Patent Number: 6,058,206
[45] Date of Patent: May 2, 2000

[54] PATTERN RECOGNIZER WITH INDEPENDENT FEATURE LEARNING

[76] Inventor: Chris Alan Kortge, 6432 Williams Ridge Way, Austin, Tex. 78731

[21] Appl. No.: 08/980,838

[22] Filed: Dec. 1, 1997

[51] Int. Cl.[7] ..................................................... G06K 9/62
[52] U.S. Cl. ............................ 382/159; 382/157; 706/16; 706/25; 706/30; 706/20
[58] Field of Search ................................... 382/157, 158, 382/159, 156; 706/20, 16, 25, 30

[56] References Cited

U.S. PATENT DOCUMENTS

| | | | |
|---|---|---|---|
| 5,060,278 | 10/1991 | Fukumizu | 382/159 |
| 5,251,268 | 10/1993 | Colley et al. | 382/159 |
| 5,359,700 | 10/1994 | Seligson | 395/24 |
| 5,422,981 | 6/1995 | Niki | 395/22 |
| 5,568,591 | 10/1996 | Minot et al. | 395/22 |
| 5,754,681 | 5/1998 | Watanable et al. | 382/159 |
| 5,812,992 | 9/1998 | Vries | 706/25 |
| 5,822,742 | 10/1998 | Alkon et al. | 706/20 |
| 5,835,633 | 11/1998 | Fujisaki et al. | 382/159 |
| 5,870,493 | 2/1999 | Vogl et al. | 382/195 |
| 5,870,828 | 2/1999 | Yatsuzuka et al. | 706/25 |

OTHER PUBLICATIONS

Oct. 1990 Földiák "Forming Sparse Representations by Local Anti–Hebbian Learning", Biological Cybernetics.

Dec. 18, 1991 Schmidhuber "Learning Factorial Codes by Predictability Minimization", Univ. of Colorado Dept. of Computer Sci. TR–CU–CS–565–91.

Jul. 1996 Jaakkola & Jordan "Computing Upper and Lower Bounds on Likelihoods in Intractable Networks", in Proceedings of the Twelfth Conference on Uncertainty in AI.

Oct. 1992 Neal "Connectionist Learning of Belief Networks", Artificial Intelligence 56, pp. 71–113.

Dec. 1996 Lewicki & Sejnowski "Bayesian Unsupervised Learning of Higher Order Structure", Advances in Neural Information Processing Systems 9 (Proceedings of the 1996 Conference, Dec. 2–5).

May 1986 Rumelhart et. al. "Learning Internal Representations by Error Propagation", Parallel Distributed Processing vol. 1, MIT Press, Cambridge, MA.

Nov. 1994 Hastie et. al. "Learning Prototype Models for Tangent Distance", Advances in Neural Information Processing Systems 7 (Proceedings of the 1994 Conference, Nov. 28–Dec. 1.

Aug. 1990 Kortge, "Episodic Memory in Connectionist Networks", Proceedings of the Twelfth Annual Conference of the Cognitive Science Society, Lawrence Erlbaum Associates, Hillsdale, NJ.

*Primary Examiner*—Amelia Au
*Assistant Examiner*—Jingge Wu
*Attorney, Agent, or Firm*—Taylor Russell & Russell, P.C.

[57] ABSTRACT

A pattern recognition device having modifiable feature detectors (28) which respond to a transduced input signal (26) and communicate a feature activity signal (30) to allow classification and an appropriate output action (70). A memory (40) stores a set of comparison patterns, and is used by an assigner (66) to find likely features, or parts, in the current input signal (26). Each part is assigned to a feature detector (28[*m*]) judged to be responsible for it. An updater (42) modifies each responsible feature detector (28[*m*]) so as to make its preferred feature more similar to its assigned part. The modification embodies a strong constraint on the feature learning process, in particular an assumption that the ideal features for describing the pattern domain occur independently. This constraint allows improved learning speed and potentially improved scaling properties.

A first preferred embodiment uses a group of noisy-OR type neural networks (50) to implement the feature detectors (28) and memory (40), and to obtain the parts by a soft segmentation of the current input signal (26). A second preferred embodiment maintains a lossless memory (40) separate from the feature detectors (28), and the parts consist of differences between the current input signal (26) and comparison patterns stored in the memory (40).

20 Claims, 12 Drawing Sheets

```
For LAY = 0 to NUMLAYERS-1 {
  For u = 0 to NUMUNITS[LAY]-1 {

Set i = ORDER[LAY][u]

If value of ACT[LAY][i] is not clamped {
      Select a new value for ACT[LAY][i]
      using Gibbs Sampling (see Fig. 7)
    }

If value of ACT[LAY][i] changed {
      If LAY > 0 {
        For k = 0 to NUMUNITS[LAY-1]-1 {
          If ACT[LAY][i] == 1 {
            Set PROBOFF[LAY-1][k] =
              PROBOFF[LAY-1][k] * (1 - WEIGHT[LAY-1][k][i])
          }
          Else {
            Set PROBOFF[LAY-1][k] =
              PROBOFF[LAY-1][k] / (1 - WEIGHT[LAY-1][k][i])
          }
          If PROBOFF[LAY-1][k] > 1 {
            Set PROBOFF[LAY-1][k] = 1
          }
        }
      }
      If LAY < NUMLAYERS-1 {
        For j = 0 to NUMUNITS[LAY+1]-1 {
          If ACT[LAY][i] == 1 {
            Set NETOFFBELOW[LAY+1][j] =
              NETOFFBELOW[LAY+1][j] + log(1 - WEIGHT[LAY][i][j])
          }
          Else {
            Set NETOFFBELOW[LAY+1][j] =
              NETOFFBELOW[LAY+1][j] - log(1 - WEIGHT[LAY][i][j])
          }
        }
      }
    }

```
For LAY = 0 to NUMLAYERS-1 {
   For i = 0 to NUMUNITS[LAY]-1 {

If ACT[LAY][i] == 1 {
         Set UNITPROB[LAY][i] =
            UNITPROB[LAY][i] * (1 - PROBOFF[LAY][i])
      }
      Else {
         Set UNITPROB[LAY][i] =
            UNITPROB[LAY][i] * PROBOFF[LAY][i]
      }

```
Set LRATE = 1

For LAY = 1 to NUMLAYERS-1 {
  For i = 0 to NUMUNITS[LAY]-1 {

Set COUNTBIAS[LAY][i] = COUNTBIAS[LAY][i] + 0.05

If ACT[LAY][i] == 1 {
       Set COUNT[LAY][i] = COUNT[LAY][i] + 0.05
       For k = 0 to NUMUNITS[LAY-1]-1 {
         Set D = -1
         If ACT[LAY-1][k] == 1 {
            Set D = D + (1 / (1 - PROBOFF[LAY-1][k]))
         }
         Set WPRE = WEIGHT[LAY-1][k][i]
         Set LPRE = -log(1 - WEIGHT[LAY-1][k][i])
         Set WEIGHT[LAY-1][k][i] = WEIGHT[LAY-1][k][i] +
            (D * LRATE * WEIGHT[LAY-1][k][i] / COUNT[LAY][i])
         If WEIGHT[LAY-1][k][i] > 0.99 { Set WEIGHT[LAY-1][k][i] = 0.99 }
         If WEIGHT[LAY-1][k][i] < 0.01 { Set WEIGHT[LAY-1][k][i] = 0.01 }
         Set PROBOFF[LAY-1][k] = PROBOFF[LAY-1][k] / (1 - WPRE)
         Set PROBOFF[LAY-1][k] = PROBOFF[LAY-1][k] *
            (1 - WEIGHT[LAY-1][k][i])
         If (PROBOFF[LAY-1][k] > 1 { Set PROBOFF[LAY-1][k] = 1 }
         If ACT[LAY-1][k] == 0 {
             Set NETOFFBELOW[LAY][i] = NETOFFBELOW[LAY][i] +
                (-log(1 - WEIGHT[LAY-1][k][i]) - LPRE)
         }
       }
    }

If last cycle and LAY == NUMLAYERS-1 {
       Set D = -1
       If ACT[LAY][i] == 1 {
          Set D = D + (1 / (1 - PROBOFF[LAY][i]))
       }
       Set WEIGHT[LAY][i][0] = WEIGHT[LAY][i][0] +
          (D * LRATE * WEIGHT[LAY][i][0] / COUNTBIAS[LAY][i])
       If WEIGHT[LAY][i][0] < 0.01 { Set WEIGHT[LAY][i][0] = 0.01 }
       If WEIGHT[LAY][i][0] > 0.25 { Set WEIGHT[LAY][i][0] = 0.25 }
       Set PROBOFF[LAY][i] = 1 - WEIGHT[LAY][i][0]
    }
  }
}
```

*Fig. 9*

PATTERN RECOGNIZER WITH INDEPENDENT FEATURE LEARNING

BACKGROUND—FIELD OF INVENTION

This invention relates to pattern recognition methods and machines, specifically to an improved method and machine for training feature-based pattern recognizers.

BACKGROUND—DISCUSSION OF PRIOR ART

Pattern recognizers can be used in many ways, all of which involve automatically responding to some physical pattern in the world. For example, the physical pattern might be speech sound waves, in which case a pattern recognition device might be used to output the same utterance but in a different language. Or the physical pattern might be the locations of vehicles on a particular highway, and the pattern recognizer might then be used to control the traffic lights on that highway so as to minimize congestion.

Often it is desirable to apply a pattern recognizer to a task which is poorly understood, or even a task which changes over time. In such circumstances, an adaptive pattern recognizer, which learns the task based on a sequence of examples, can work much better than a "hard-wired" (nonadaptive) one. Also, like adaptivity, "feature based" recognition can be very advantageous, in general because it tends to be more noise-tolerant than other approaches (such as fixed template matching). Feature based recognition involves responding to a set of features, or characteristics, which are determined to exist within the pattern. For example, if the patterns were speech waveforms, the features detected might include "a 'k' sound", or "a high-amplitude frequency within the twenty-eighth time interval". In a recognizer which is adaptive as well as feature-based, the features may even be very complex and difficult to describe in human language.

The device of the present invention is both adaptive and feature-based. One of the most difficult problems in designing such pattern recognizers is determining the best set of features—or more precisely, determining how the recognizer should be trained so that it will learn the best set of features. Very often, once a good set of features is found, the recognition problem becomes trivial.

One approach to learning good features is the use of a neural network trained with the backpropagation method (Rumelhart, Hinton, & Williams, 1986, "Learning internal representations by error backpropagation", in *Parallel Distributed Processing: Explorations in the Microstructure of Cognition*, MIT Press, Cambridge, Mass.). However, this approach (and many related gradient-based neural net methods) can be very slow to learn, especially with networks having many layers of neurons. It is also quite possible that it will not learn optimal, or even nearly optimal, features. This is because it is based on a hill-climbing type of learning which can get stuck in a "valley" very far from the globally optimal solution. The result might be features which work well on the training examples, but not on new examples (i.e., poor generalization of learning).

There have been many attempts to improve on the learning speed or the generalization ability of these neural network pattern recognizers, but typically such improvements either do not solve both of these problems at once, or do not result in significant improvement on a usefully wide range of tasks. Arguably, the solutions which work best, though, tend to be ones which impose constraints on the learning process; that is, based on some assumptions about the task at hand, they constrain the learning so that only certain feature sets can be (or are likely to be) learned. Such constraints effectively reduce the amount of "feature space" which must be searched by the learning process, making the process both faster and less susceptible to getting stuck with bad features.

One example of constraint-based feature learning is that of Simard et al. (e.g. Hastie, Simard, & Sackinger, 1995, "Learning prototype models for tangent distance", in *Advances in Neural Information Processing Systems* 7, MIT Press, Cambridge, Mass.). Their neural network-type method is applied to character (e.g. handwriting) recognition. In effect, their approach is to force the network to automatically generalize anything it learns about a particular example character to all possible "transformed" versions of the character. Here, the transformations include stretching, shrinking, slanting, and the like. While this does significantly improve generalization (and learning speed, since a smaller set of examples is required), the solution is rather specific to things such as writing. It wouldn't directly apply to speech waveforms, for example. A further disadvantage of this solution is that it only applies at the input level, where the features are first input to the neural network. It doesn't help at the internal layers of a multilayer network, because these internal features are learned, and thus it is not clear how to apply spatial constraints (e.g. slant-independence) to them. Similarly, this method doesn't address the problem such neural networks have in scaling up to large numbers of features. This scaling problem (which creates prohibitively long training times) results from the exponentially increasing number of possible feature combinations, and must be solved at all levels of feature detection in order to be significantly reduced.

OBJECTS AND ADVANTAGES

Accordingly, my invention has several objects and advantages over the prior art pattern recognition methods. Like backpropagation and some other neural network training methods, my invention may be used for adaptive learning within a feature based pattern recognition machine. It improves upon these previous methods however, in that it provides a strong constraint on the learning, thus reducing the learning time and reducing the likelihood of poor features being learned. This constraint is based on an assumption that the ideal (or "true") features occur independently (are not "correlated") in the set of physical patterns. Ironically, this assumption has often been invoked in the prior art, but prior to my invention has not been used to its fullest extent.

My method makes much more extensive use of the independent features assumption, making it very powerful. Because this assumption is not limited to a particular class of pattern recognition tasks (e.g. only optical character recognition), my invention's advantages are likely to be obtained on a wide variety of tasks. Furthermore, the assumption is actually more powerful when more feature detectors are used. This allows for potentially improved scaling of the method to larger recognizers, which has long been a goal of the neural network research community. Still further, the independent features assumption can be applied at every layer of a hierarchical, multilayer recognition device. This gives my device even more ability to speed learning and improve generalization when compared to constraint-based procedures which apply only at the input layer.

A further object of my invention is that multiple similar recognition systems can be created by training one such system and transferring the resulting trained weights to another system.

Further objects and advantages of my invention will become apparent from a consideration of the drawings and ensuing description.

DESCRIPTION OF DRAWINGS

FIG. 6 is a flow diagram of a single cycle of Gibbs sampling as performed in the first preferred embodiment.

FIG. 8 is a flow diagram of a procedure for updating a unit's contribution to the likelihood within a cycle of the Gibbs sampling process of the first preferred embodiment.

FIG. 9 is a flow diagram of a procedure for updating connection weights within a cycle of the Gibbs sampling process of the first preferred embodiment.

LIST OF REFERENCE NUMERALS

Figure 1:
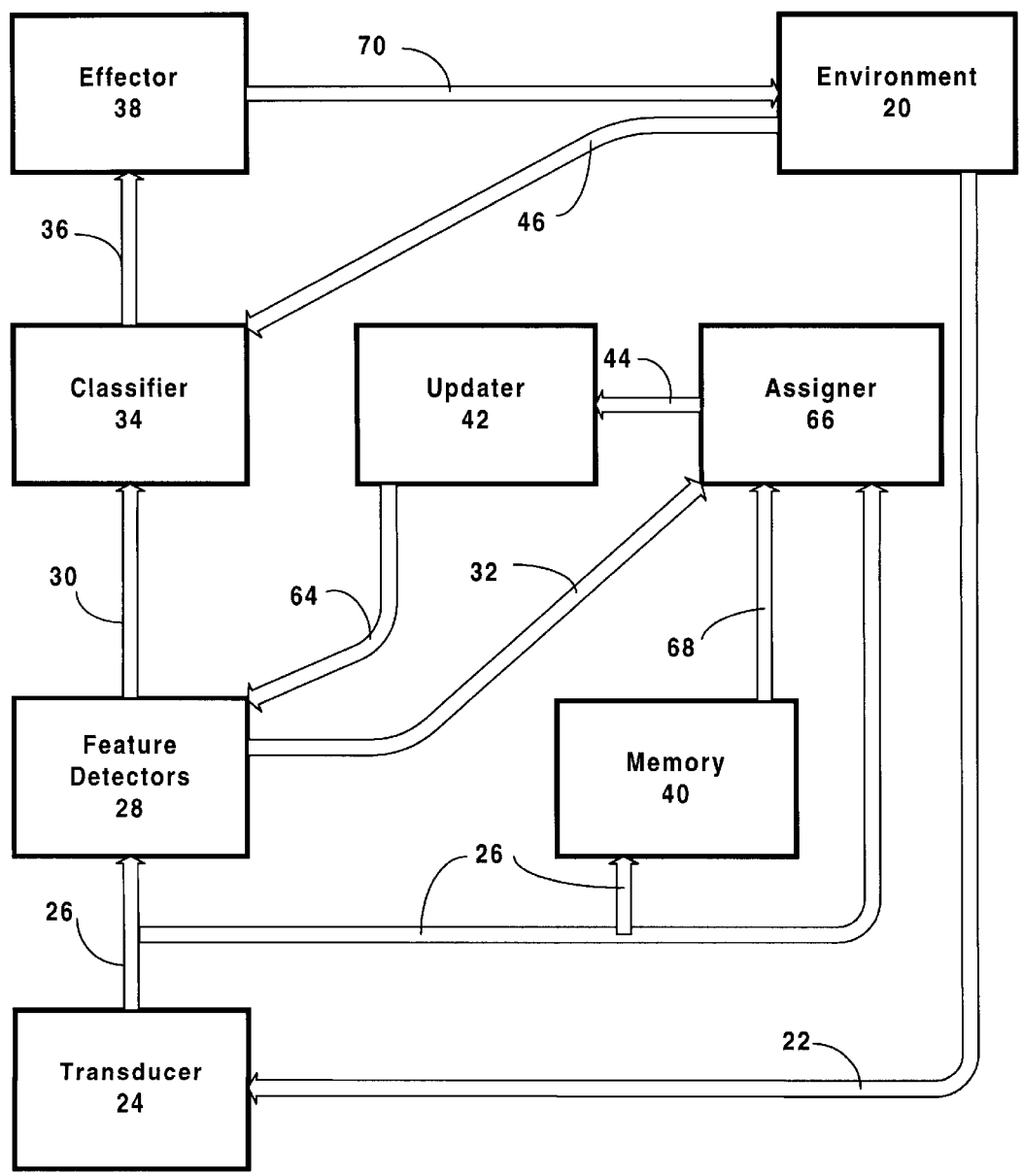
FIG. 1 is a block diagram of a pattern recognition system according to the present invention, showing subsystems common to both preferred embodiments.

20 Environment and/or Further device
22 Physical pattern
24 Transducer
26 Input signal
28 Feature detectors
30 Feature activity signal
32 Feature description signal
34 Classifier
36 Output signal
38 Effector
40 Memory
42 Updater
44 Part mapping signal
46 Target signal
50 Class networks
64 Updating signal
66 Assigner
68 Retrieval signal
70 Action

SUMMARY

In accordance with the present invention a pattern recognition device comprises a sensory transducer, a group of feature detectors, a classifier, and an effector to automatically respond to physical patterns. The device further comprises the improvement wherein an assigner uses previous input patterns, as stored in a memory, to segment a current input pattern into parts corresponding to the feature detectors, and at least one feature detector is modified so as to increase its preference for its assigned part.

Theory of the Invention

I believe there are interesting theoretical reasons for the advantages of my invention. This section describes this theory as I currently understand it.

Machines and/or methods of pattern recognition which are feature-based can be very powerful. For example, consider a recognizer for printed characters which has detectors for such features as "horizontal line at the top", "vertical line on the right", etc. One reason this is a powerful approach is that a relatively small number of such feature detectors can cooperate to recognize a large number of possible characters. Indeed, the number of different recognizable characters increases exponentially with the number of features (although this exponential increase is both a blessing and a curse, as will be explained shortly). For example, using only 20 binary (on/off) features, over a million possible patterns can be recognized; with 1000 features, the number of possibilities is almost too hard to comprehend—and this is still a puny number compared to the number of neurons in a human brain!

Another advantage of feature based recognition is noise tolerance. Essentially, if "enough" of the features in a pattern are detected, recognition can be good even though feature detection is not. For example, a capital "A" could be recognized even if the "horizontal bar in the middle" was missed (perhaps due to a bad printer), simply because "A" is the only letter with the (detected) features, "right-leaning diagonal on the left", "left-leaning diagonal on the right", and "intersecting line segments at the top". There are many possible feature sets which might be used for character recognition, but these serve to illustrate the basic point of fault-tolerance.

As powerful as feature based recognition can be, it is still much more powerful when the features can be learned from examples, rather than being hardwired by a human designer. Such adaptivity underlies the recent research interest in neural networks, for example, which in their most typical form are just successive layers of (adaptive) feature detectors. Indeed, many would argue that human intelligence is so impressive partly because it is based on naturally occurring adaptive neural networks with billions of neurons, wherein each neuron can be viewed as a feature detector.

However, the power of adaptive feature based recognition has always come at a price. In particular, learning the features can be very slow, and can result in suboptimal features being learned. Moreover, this problem seems to get worse, the greater the number of feature detectors being trained. This is the "curse" aspect of the exponentially increasing number of feature combinations, as alluded to above.

I believe, though, that the curse is not as bad as the prior art literature would suggest. Indeed, I believe it can't be, or else human brains, with their billions of feature-detecting neurons, could not learn nearly as fast as they do. I further believe that my invention makes use of a principle which is also used by human brains. This principle is what I call "independent feature learning".

Most prior art recognizers (adaptive feature-based ones) perform training of the feature detectors in an essentially similar way: They first attempt to identify which (important) features are contained in the current input pattern. Then they modify all the feature detectors so as to make the entire recognizer better at detecting that particular combination of features. Thus if a "T" was observed, the combination of features "top horizontal bar" and "middle vertical bar" might be reinforced. Importantly, this means that now whenever "top horizontal bar" is observed, "middle vertical bar" will be considered more likely as well, and vice versa. The recognizer has been taught that these two features are (to some extent) correlated in the set of possible input patterns.

The essence of my invention, on the other hand, is the assumption that features are not correlated; rather, they are assumed to be statistically independent of one another throughout the set of input patterns. An embodiment of my invention, upon observing the "T", might train one feature detector to better respond to "top horizontal bar", and another to increase its preference for "middle vertical bar", but without increasing the preference of any detector for the combination of these two features.

Why should this be a good training method? Because in the absence of evidence to the contrary, it is a good first guess that any given feature could occur within any other combination of features. A recognizer which has just "discovered" the "top horizontal bar" feature, for example, could also find this feature useful when it later encounters "E", "F", "I", "Z", "5", "7", and perhaps other symbols too. But if it had been trained that "top horizontal bar" implies "middle vertical bar" as well—as prior art recognizers typically learn when observing a "T"—it would later have to unlearn this information when it encountered the other symbols. In essence, my device is advantageous because it does not require such unlearning. Indeed, I believe that in a typical prior art training regime, the appropriate unlearning of spurious correlations often never occurs, because the amount of training patterns is just too small. Thus I believe my device can not only learn with many fewer pattern observations, but it can also learn better features based on those observations.

Moreover, I believe this advantage becomes more and more important as the number of feature detectors increases. This is because the number of feature combinations increases exponentially, so in some sense the amount of inappropriate correlation learning done by prior art recognizers also increases exponentially—and thus so does the amount of unlearning that must be done. This means my device has the potential for improved scaling to large numbers of feature detectors.

One might argue that the assumption of independently occurring features—which leads to my approach of training the feature detectors independently—is not necessarily appropriate in all situations. For example, what if (in some strange alphabet) the letter "T" was the only letter with a "top horizontal bar" or a "middle vertical bar"? Surely then it would be appropriate to train the recognizer that these features always occur together, wouldn't it? One answer to this is that in such a situation, the entire "T" would be a more appropriate feature to learn. More generally, features which are highly correlated with other features tend not to be very useful anyway; they tend to waste feature storage capacity in the recognizer. In any case, though, my invention does not prevent the learning of correlations among features. It simply makes independence of features the default assumption; this assumption can still be "overruled" by further learning.

Some prior art methods have invoked the principle of independence, in an attempt to encourage learning of "factorial", or "information preserving" internal representations. One example is that of Foldiak (1990, "Forming sparse representations by local anti-Hebbian learning", in Biological Cybernetics, 64:165–170), which incorporates "competitive" connections between the feature detectors to encourage them to learn different features. However, these prior art methods have not made use of the independence assumption nearly to the degree possible. For example, systems like Foldiak's which incorporate competitive connections can only discourage second-order dependencies (correlations), not higher-order ones, as does my device. Also, these systems often perform "batch" training, where weight changes are saved, and actually performed only after a set of pattern presentations. Unlike my device, such procedures do not allow the learning done on a current pattern to be immediately used for assisting future learning.

Furthermore, I believe it is typical of these prior art methods that an essentially distinct subsystem (e.g. separate connections, or an additional penalty term in the training cost function) is used to counteract the effects of an otherwise conventional training procedure. In such a method, I believe, the countermeasure will always lag behind the principal, error-reducing weight updates. My invention, in contrast, embeds the independence assumption in the principal (and only) weight update procedure; thus the dependencies need not be learned by a separate subsystem in order to be (later) removed.

Commonalities of the Preferred Embodiments

Figure 2:
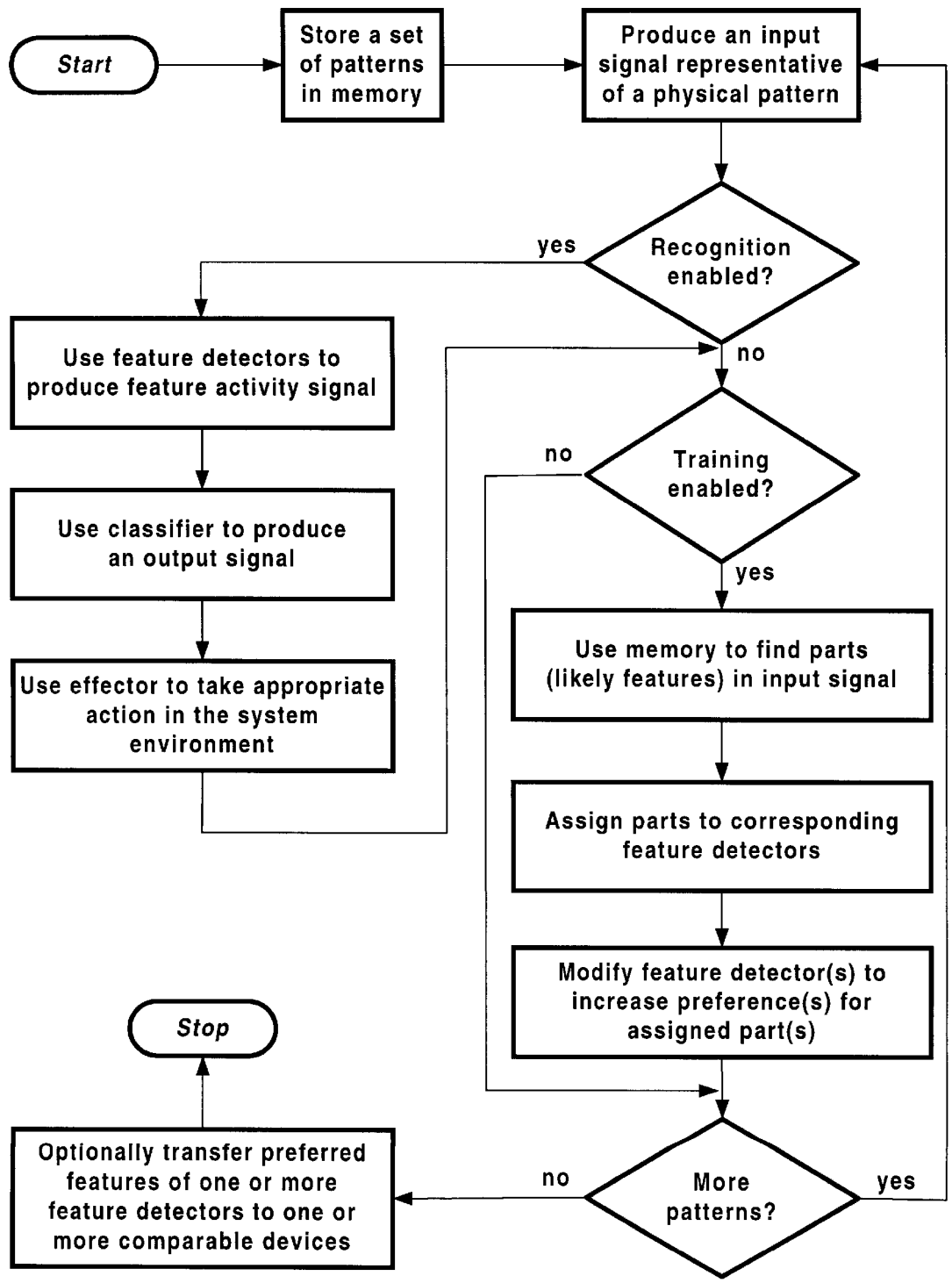
FIG. 2 is a flow diagram of an overall procedure for operating the preferred embodiments.

This section describes aspects of the invention which are common to both of my preferred embodiments, with reference to FIGS. 1 and 2. Details of the preferred embodiments are given below.

Overview

FIG. 1 illustrates an overview of a pattern recognition device according to the invention. Direction of signal propagation is indicated by arrows. Propagation of multiple-element signals should be logically parallel for the most part, meaning most (and preferably all) of a signal's elements (each of which represents a scalar value) should be received by a corresponding processing stage before that stage performs its operations and outputs its results. For clarity, each signal communication line is given a reference label identical to that of the signal which uses that line.

Operation of the system (described further below) is regulated by a user, which may be simply a human user or may be or include a further device. This regulation includes the orientation of the system such that it interacts with an environment and/or further device 20 (referred to hereafter as simply the environment 20). This orientation is such that a physical pattern 22 is communicated from the environment 20 to the system, in particular to a transducer 24. The transducer 24 converts the physical pattern 22 into a representation of that physical pattern 22, which conversion I take to include any "preprocessing" operations. This representation takes the form of an input signal 26. I will often refer herein to the information represented by a given input signal 26 as an "input pattern".

A group of feature detectors 28 is connected to receive the input signal 26 from the transducer 24. Each of the feature detectors 28 is configured to detect or "prefer" a certain feature vector when it occurs in the input signal 26. Each feature detector 28[$m$] outputs a corresponding feature activity signal element 30[$m$] representative of the (scalar) degree to which it has detected its feature within the current input signal 26 (i.e., the degree to which the detector "fires", or finds a good "match" in the input signal 26). In some embodiments this feature activity signal element 30[$m$] may reflect the results of competition or other communication between the feature detectors 28. Each feature detector 28[*m*] is also configured to output a multiple-element feature description signal element 32[*m*], which is representative of the feature the detector 28[*m*] prefers.

A classifier 34 is connected to receive the feature activity signal 30 from the feature detectors 28. The classifier 34 is also connected to receive a target signal 46 from the environment 20. The classifier 34 is configured, via training (using the target signal 46) and/or hardwiring, to produce an output signal 36 representative of an appropriate system response given the feature activity signal 30. For example, the output signal 36 may represent degrees of membership in various classes, such as the probability a handwritten character input is 'A', 'B', 'C', etc. It is important to note that the classifier 34, while named such to reflect its typical use, need not actually perform a classification per se. The important thing is that the output signal 36 it produces represents an appropriate system response, whether or not it also represents a class label.

An effector 38 is connected to receive the output signal 36, and is configured to take some action 70 in the world based on that signal 36. For example, if the system is being used to recognize handwritten characters, the effector 38 might store an ASCII representation of the most probable character into computer memory, perhaps to allow a user to send email using a device too small for a keyboard.

The feature detectors 28 are trained using a memory 40, an assigner 66, and an updater 42. The memory 40 is connected to receive the input signal 26. The memory 40 is capable of storing, possibly in an approximate ("lossy") way, a representation of a set of previous input patterns, which are called "comparison patterns" with respect to the current and future input signals 26.

The assigner 66 is connected to access the stored contents (comparison patterns) of the memory 40 via a retrieval signal 68. It is capable of using this storage to segment the current input pattern (as represented by the current input signal 26) into parts. Each part represents a vector which is judged by the assigner 66 to be a likely feature which is not only contained in the input signal 26, but is also likely to be useful for describing the collection of stored comparison patterns in the memory 40. Put differently, a part is a vector which is judged likely to be a true feature of the entire input domain, which includes past patterns, the current pattern, and (hopefully) future patterns as well.

The assigner 66 is connected to receive the feature description signal 32 and makes use of this signal 32 to create a part mapping signal 44, representative of a correspondence between feature detectors 28 and the parts. As described later, the memory 40 may also make use of the feature detectors 28 in storing input patterns. Furthermore, the assigner 66 may make use of the target signal 46 in creating the part mapping signal 44. The parts themselves may be explicitly represented (internally) by the assigner 66, or may only be represented implicitly in the part mapping signal 44.

Figure 3:
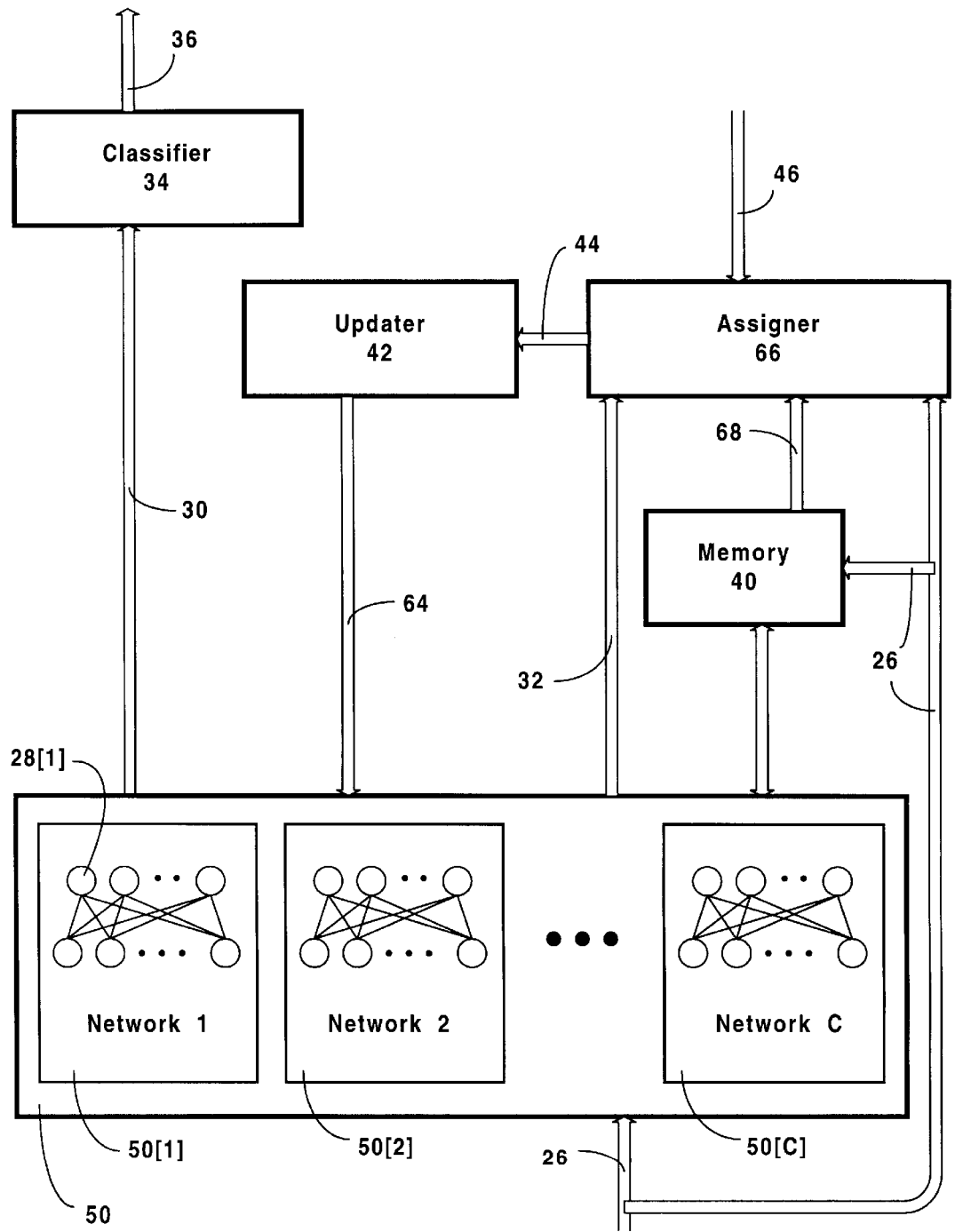
FIG. 3 is block diagram showing the structure of the first preferred embodiment.
Figure 10:
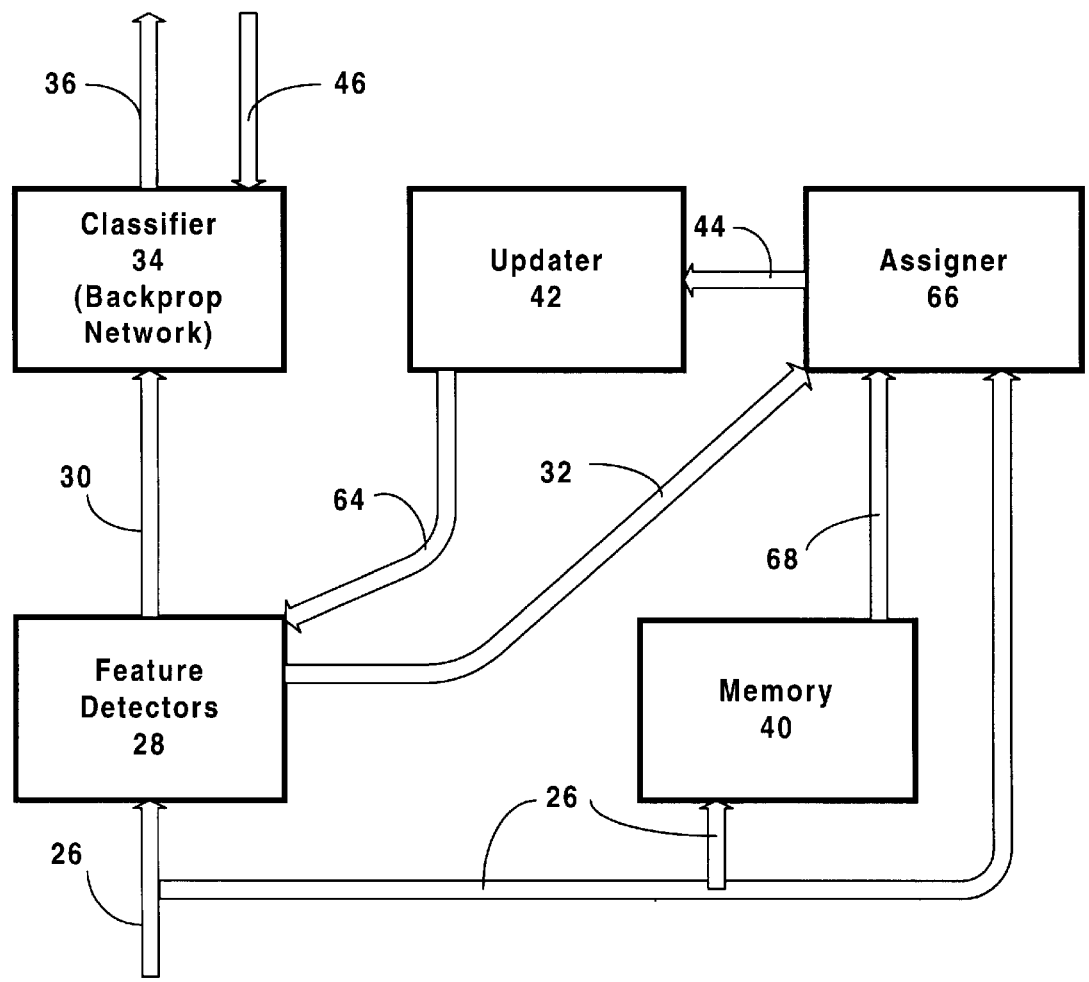
FIG. 10 is a block diagram showing the structure of the second preferred embodiment.

The updater 42 is connected to receive the part mapping signal 44 from the assigner 66. It is configured to modify the feature detectors 28 based on this signal 44. In particular, the updater 42 can modify a feature detector 28[*m*] so as to increase the preference that the feature detector 28[*m*] has for the part corresponding to it. Put differently, the preferred feature of the feature detector 28[*m*] is moved toward, or made more similar to, the part assigned to it. The influence of the updater 42 is indicated in FIGS. 1, 3, and 10 by an updating signal 64. In some non-preferred embodiments, however, the feature updates might be made directly (e.g. via hardware), with no intervening updating signal 64 being required.

FIG. 2 illustrates an overview of the operation of a pattern recognition device according to the invention. Use of the device comprises a sequence of "trials", or physical pattern presentations. On each trial, either recognition is performed, or training is performed, or both are performed. In my preferred embodiments, recognition (if enabled) is performed before training (if enabled). However, many useful embodiments might exist wherein training is done before or simultaneous with recognition.

Both recognition and training require the physical pattern 22 to be observed, and a representative input signal 26 to be produced by the transducer 24. Other steps depend on whether recognition and/or training are enabled.

The schedule of enablement of training and recognition over trials is discussed below for each embodiment separately. One point should be made here, though. In my second preferred embodiment, the memory 40 is separate from the feature detectors 28, and input patterns are stored in the memory 40 before any training or recognition occurs. However, in my first preferred embodiment, the feature detectors 28 are actually used to implement the memory 40. In this case, storage of patterns in memory 40 is accomplished by the same procedure as training of the feature detectors 28. Thus, with respect to the first preferred embodiment, the step shown in FIG. 2 as "Store a set of patterns in memory" includes the setting of initial random preferred features, and possibly doing feature training on some number of patterns.

If recognition is enabled, the input signal 26 is communicated to the feature detectors 28, which evaluate the input against their preferred features and produce appropriate feature activity signal elements 30[1] through 30[M]. (In some embodiments an equivalent step is done as part of the training process, too.) The feature activity signal 30 (composed of the elements 30[1] through 30[M]) is used by the classifier 34 to produce an output signal 36. The output signal 36 is used by the effector 38 to take an appropriate action 70 within the system's environment 20.

If training is enabled, the input signal 26 is communicated to the memory 40, which may store the current input pattern information, and to the assigner 66. The assigner 66 uses the stored comparison pattern information, obtained from the memory 40 via the retrieval signal 68, to segment or parse the input signal 26 into parts. (In some embodiments the memory 40 may be implemented using the feature detectors 28 or their equivalent). The assigner 66 then uses the feature description signal 32 to assign the parts to corresponding feature detectors 28. The results of this assignment are communicated via a part mapping signal 44 to the updater 42. The assigner 66 may in some embodiments make use of the target signal 46 to perform the assignment. The updater 42 modifies the preferred features of the feature detectors 28. The modification is such that a feature detector 28[*m*] increases its preference for the part assigned to it.

After a significant number of training trials have occurred, the feature detectors 28 store valuable information about the input pattern domain, which may be used to bypass the training phase in a comparable pattern recognition device. Thus as shown in FIG. 2, the preferred features of one or more of the feature detectors 28 may be transferred (which includes being copied) to one or more comparable devices after some amount of training. A comparable device would be one having a transducer similar to the transducer 24, and one or more feature detectors similar to the feature detectors 28, so as to be capable of making appropriate use of the trained preferred features.

Implementation Details

Each of my preferred embodiments is implemented using a suitably programmed general-purpose digital computer. Generally speaking, signals and other representations will thus be implemented with storage space in the random access memory of the computer. Such an implementation is preferred in part because of the high availability and relatively low cost of such machines (as opposed to, for example, analog and/or non-electronic devices). Certain experimental manipulations may also be desirable, and these will typically be easiest to perform on a general-purpose machine via software. Furthermore, those skilled in the art of adaptive pattern recognition tend to be most familiar with software based implementations of pattern recognizers. Still further, such a system, once trained, can easily be used to create other systems to perform similar tasks, by copying trained weights and/or program code into other recognition systems.

In order to describe the computer program part of the preferred embodiments, variable names will be used to denote corresponding digital storage locations. These variables, along with the system parts which they implement, will be given with the preferred embodiment specifics below.

Pseudo-code Conventions

Some of the drawings make use of a "pseudo-code" which largely resembles the C programming language. One reason for this is to reduce the number of figures which must be used to represent a procedure. I believe this will make the overall methods depicted easier to understand by a typical pattern recognition programmer than if the methods were broken up into still more figures. In fact, the pseudo-code should be readily understandable by anyone skilled in C or a similar language. However, I will describe the least obvious conventions next.

Assignment to variables is indicated by a "Set var=value" statement. This is the equivalent of the C assignment operation "var=value".

A processing loop is indicated by a "For x=begin to end {loop-body}" statement. Here, loop-body is the code over which to loop, and x is an integer index variable whose value is typically referenced within the loop body. The loop is performed first with x equal to begin, and x is incremented by one before each successive iteration, until x is greater than end, at which point no further iterations occur.

Conditional code execution is implemented with an "If boolvar {conditional-code}" statement. Here, the conditional-code statements are executed if and only if the expression represented by boolvar evaluates to TRUE (nonzero). Sometimes I use an English language expression for boolvar, where the evaluation method is apparent. Also, a corresponding "Else { }" clause may be used with an "If" statement, as in C.

An array is often indicated by notation such as arrayvar[ ], or arrayvar[ ][0]. Such arrays represent vectors, as they have exactly one dimension with no specified index. Similarly, arrayvar[ ][ ] would indicate an entire two-dimensional array, and arrayvar[2][3] would indicate just a single element of a two-dimensional array. Also, array index brackets will be dropped for clarity when the context makes the meaning clear.

The operator "log" indicates a natural (base e) logarithm operation. The operator "exp" indicates a base e exponentiation operation. MIN(x, y) returns the minimum value of x and y.

Transducer

At the front end of the system is the transducer 24, which senses a physical pattern 22 and produces an input signal 26 representative of it. The physical pattern 22 may be virtually any object or event, or conglomeration of objects and/or events, that is observable. Similarly the transducer 24 may be anything capable of detecting such an observable. It may include, for example, photodetector cells, a microphone, a camera, sonar detectors, heat sensors, a real-time stock quote device, a global position device implanted in a blind person's cane, and so on. It may detect electronically stored patterns, for example a stored hypertext document on a remote network server. The transducer 24 may also include one or more humans, as for example when survey results are observed. Those skilled in the art of adaptive pattern recognition will readily find many diverse physical pattern domains to which the present invention may be applied, as there are a great number of known methods and devices for sensing an extremely wide variety of patterns in the world.

The transducer 24 is also assumed to handle any necessary "preprocessing" of the physical pattern 22. Preprocessing includes any known, hardwired transformations used to remove unwanted redundancy in the input, fill in missing values, and the like. These operations tend to be problem specific, and there are a great many possible ones. Some examples are: line extraction in character recognition; band-pass filtering of audio (e.g. speech) signals; and translation, rotation, and size normalization of images. It is important to note, though, that preprocessing is less important when using an adaptive feature-based device such as that of the present invention. While still useful, especially in well-understood domains, appropriate preprocessing can to some extent be "learned" by the adaptive part of the device. Because of this, in a worst-case scenario, wherein the system designer knows virtually nothing about the features contained in a physical pattern domain (and thus what preprocessing operations are appropriate), the present device can still be used without any preprocessing (i.e. with "raw" input data).

Those skilled in the art of adaptive feature-based pattern recognition will be familiar with methods for producing a sequence of input signals 26 and presenting these to a digital computer based recognizer in the form of a sequence of vector values. Thus herein it is simply assumed that the input signal 26 is available as the variable INPUT[ ]. Note that transduction (including preprocessing) may be done off-line; that is, recognition and/or learning may be performed on an input signal 26 obtained from stored data, as long as transduction occurred at some time to produce the stored data.

The variable INPUT[ ] is assumed to be binary with 0/1 values. If necessary, analog information may be converted to binary using the Albus Method (BYTE magazine, July 1979, p. 61, James Albus) or another such known method. I believe there are straightforward extensions of my preferred embodiments which will work on analog inputs, but since I have not tested these, binary representations are preferred.

Effector

The last stage of the recognition process is handled by the effector 38. The effector 38 takes the output signal 36, in the form of the vector computer variable OUTPUT[ ], and produces an action 70 in the system's environment 20 which is (after learning) as appropriate as possible for the current input signal 26. As with transduction, this stage is well known in the prior art and thus will not be detailed here. Examples of effectors would be gears on a robot, traffic lights, a speaker, or a digital storage device. Combinations of different types of effectors might also be used. One use of a digital storage type effector would be to store an output signal 36 for future use. Such storage might, for example, permit the invention to be used in implementing a database (perhaps of hypertext documents), wherein future queries would access the digitally stored outputs. In such an embodiment the effector 38 might, for example, store a copy of the input signal 26 along with an estimated class label obtained from the classifier 34 via the output signal 36.

Notes on Experimentation

A certain amount of experimentation is inherent in the optimal use of adaptive pattern recognition, just because the pattern domain is never completely understood (or else an adaptive system would not be required in the first place). Thus adaptive pattern recognizers are best viewed as tools for solving a problem, rather than the solution itself. However, with reasonable experimental techniques, the performance gap between a perfectly optimized recognizer and a practically optimized one can be made much smaller. Furthermore, even a minimally optimized recognizer architecture, once trained, can often outperform any existing solutions, making it extremely valuable despite being "non-optimal".

In general, the experimental techniques appropriate for my preferred embodiments are the same as those known by those skilled in the art of adaptive pattern recognition. I will point out herein where any special considerations should be made with respect to my preferred embodiments. *The Handbook of Brain Theory and Neural Networks* (Arbib, ed., MIT Press, Cambridge, Mass.) is a very comprehensive reference for techniques related to adaptive pattern recognition, and also contains numerous references to related prior art reference material. The sections referring to backpropagation and unsupervised learning will be especially relevant, and will point to other relevant material. References such as these should be used to learn about appropriate experimental techniques, if not already known.

Preferred Embodiment 1

Architecture Figure and Flow Diagram

Figure 4:
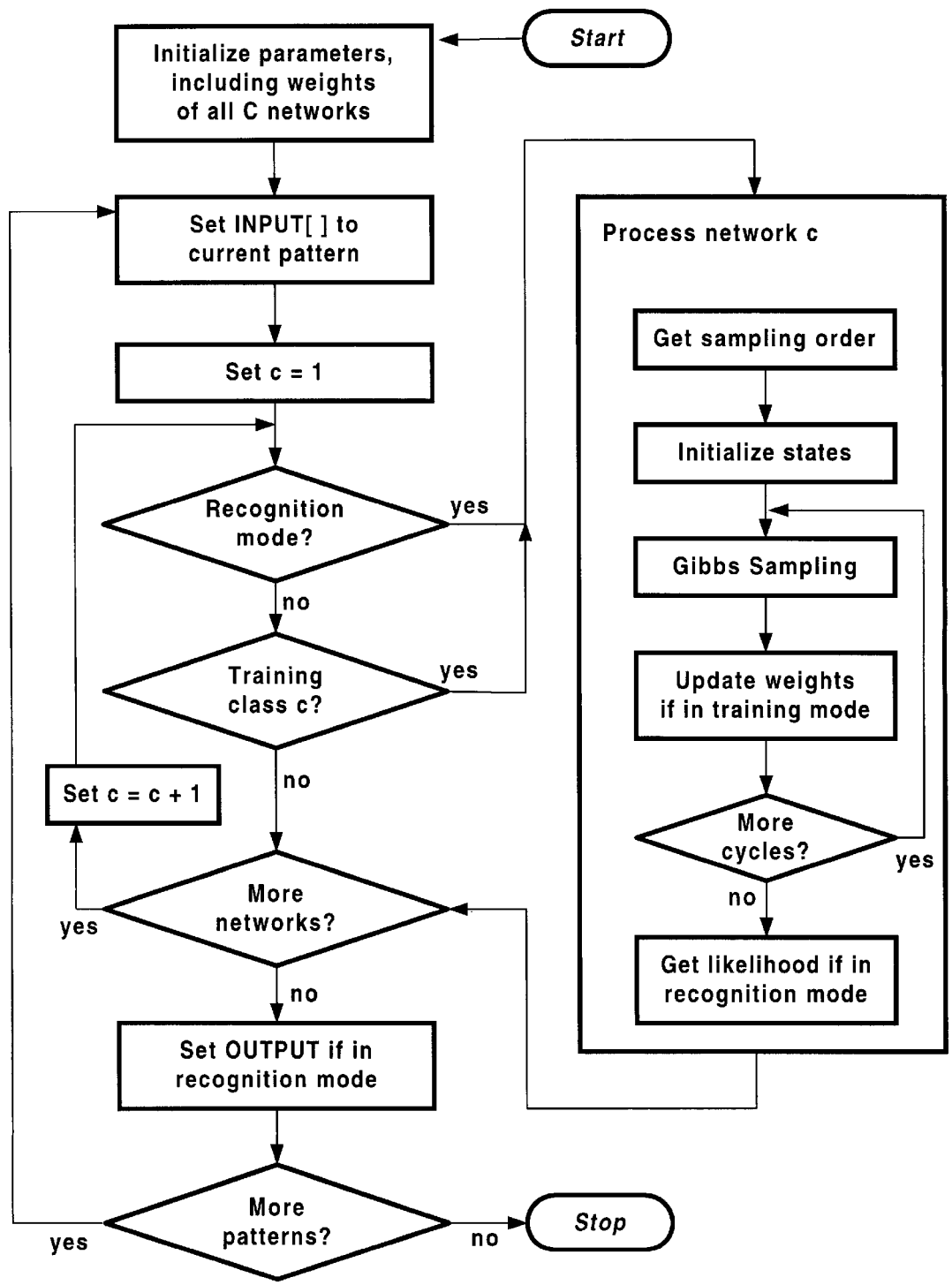
FIG. 4 is a flow diagram of an overall procedure for operating the first preferred embodiment.

My first preferred embodiment is described with reference to FIGS. 3 through 9. FIG. 3 illustrates the structure of the first preferred embodiment in more detail than in FIG. 1. The environment 20, transducer 24, and effector 38 are left out of FIG. 3 for clarity. FIG. 4 provides a flow chart illustrating an outline of the software implementation in more detail than in FIG. 2, and FIGS. 5 through 9 provide more detailed flow charts of the steps involved.

Theory

My first preferred embodiment makes use of a so-called "noisy-OR" neural network architecture. Radford M. Neal provides a good description of the theory of such networks, and provides further references ("Connectionist learning of belief networks", *Artificial Intelligence* 56, 1992, pp. 71–113). These references should be used to provide any required background beyond that provided herein, except with respect to the learning procedure. My learning procedure is different from the one described by Neal. Another description of noisy-OR networks is provided by Jaakkola and Jordan ("Computing upper and lower bounds on likelihood in intractable networks", in *Proceedings of the Twelfth Conference on Uncertainty in AI*).

A noisy-OR network uses binary (0/1 preferably) units, or neurons, which are activated according to a so-called noisy OR function. According to this method, there is a quantity $p[i][j]$ for each pair of units i and j, representing the probability that unit j "firing" (having value 1) will cause unit i to fire as well. (Neal works instead with the values $q[i][j]$, where $q[i][j]=1-p[i][j]$.) There is also potentially a "bias" value for each unit, which is essentially a connection from a hypothetical unit which is always on (firing). My preferred embodiment uses bias weights only for the highest-level units, though.

In my preferred embodiment the units are arranged in layers, with the bottom layer representing the input pattern (i.e., corresponding to the input signal 26). The goal in such a network is to learn an internal model of the pattern domain. This is also referred to as "unsupervised" learning. The internal model can also be viewed as a "pattern generator", and represents a probability distribution over the input pattern space. Ideally, a trained noisy-OR network could be used to randomly generate patterns whose distribution would very closely match the distribution of the training patterns. Because this type of network is most naturally viewed as a pattern generator, the connections will be said to feed from top to bottom in the network. However, in practice data flows both ways along the connections.

Recognition could occur in at least two basic ways in such a network. First, the network could be given a partial input pattern and its internal model used to fill in the missing input values (assuming during training there were input patterns without these values missing). The missing values could represent class labels, in which case the network could be used for classification. Note that classification learning is often viewed as "supervised" learning, but nevertheless a so-called unsupervised procedure can still be made to perform a similar task.

A second way of doing recognition with such a network—which is my preferred way—is to use a separate class network $50[c]$ to model each class, as shown in FIG. 3. At recognition time, the input pattern is presented to each class network $50[c]$, and each is used to produce a likelihood value representing the probability that that network would generate the input pattern. These likelihood values are computed by the classifier 34, which receives from the class networks 50 the feature activity signal 30 as well as other information needed to compute the likelihoods, such as the network weight values and activities of non-hidden units. The classifier 34 combines these likelihood values (via the well known Bayes Rule) with the prior class probabilities, to obtain the (relative) posterior class probability information. From this information it computes the index of the most probable class, which it communicates via the output signal 36. Note that in this embodiment, any hidden unit in any network can be viewed as one of the feature detectors 28.

The separate-networks approach has a drawback, which is that feature detectors cannot be shared by different classes. However, it circumvents a problem with the missing-value approach, which is how to force the network to learn features relevant for the classification task.

During recognition, the input signal 26 is presented to each class network $50[c]$ in turn, and class likelihood values are computed as described, by the classifier 34. During learning, however, the input signal 26 is only presented to the class network $50[cTarget]$ corresponding to the (known) target class of the input pattern. Likewise, only the target network is trained on the current pattern. Since all the class networks 50 operate similarly, the network index will be suppressed herein for clarity where it is immaterial.

Both recognition and learning require an inference process whereby the network $50[c]$ fits its internal model to the current input data (as represented by the current input signal 26). Typical prior art implementations of noisy-OR networks use some sort of iterative inference process, in which multiple "activation cycles", or updates of unit activations, are performed. My preferred inference process is also of this type. Two results of this inference process are especially important. First, a likelihood value is produced which (ideally) represents the probability that the network would produce the current input. This likelihood value is computed by the classifier 34 to facilitate classification. Second, the inference process produces a mapping from feature detectors 28 to input parts. In this case, each non-input unit is a feature detector 28[$m$], and the "input part" corresponding to a unit is that part of the activation pattern in the layer below which the unit is judged to be "responsible" for producing (keeping in mind that we are viewing the network as a pattern generator).

My preferred inference process is Gibbs sampling, a technique known in the prior art. It is a statistically based process, involving successive random sampling of the units' activity states (on or off). Each unit is visited in turn, and its activity is selected from a distribution conditional on the current states of all the other units in the network. If this process is run "long enough", the distribution of network states will come to mirror their likelihoods, i.e. their respective probabilities, given the network's input data. An average over several such states can thus provide an estimate of the overall likelihood of the network model.

One of the virtues of this embodiment is that the inference process is iterative, and incorporates feedback. This effectively allows upper layers to influence how lower layer units are activated, when multiple hidden layers are used. Such top-down influences can lead to more flexible and accurate recognition overall. However, this extra power comes at a price: more processing time is required, relative to methods which are strictly feedforward. This extra processing can be minimized, though, by stopping the iterations when the changes they produce become less than some criterion.

Gibbs sampling is also used for learning purposes. For each state of the network, a responsibility value r[i][j] can be computed for each pair of units i and j, representing the responsibility that unit j had for causing unit i to fire. Note that r[i][j] is not the same as the value p[i][j] mentioned above. The p[i][j] is a hypothetical probability: the probability that unit i would fire if unit j were to fire. The value r[i][j], on the other hand, represents the effect unit j actually had on unit i, given a particular instantiated network state.

The array of responsibility values for two connected layers of units constitutes a segmentation; it indicates which "parts" of the lower layer activities "go with" which units in the upper layer. Each unit in the upper layer is judged responsible for a certain part of the activity in the lower layer (unless it is inactive, in which case it is not responsible for anything). Viewing the upper layer units as feature generators, the responsibilities indicate what features were generated to create the lower layer activities, and which units generated which features. The units can also be viewed as feature detectors of course, and a unit's preference for a given feature is directly related to its probability of generating that feature. Note also that units can share responsibility for a given "on" unit in the layer below. This will be referred to as "soft segmentation", as opposed to "hard segmentation" wherein only one unit is allowed to be responsible for an "on" unit.

Learning occurs by moving the p[ ][j] values for unit j toward the corresponding r[ ][j] values for unit j. Put differently, we can view the vector of unit j's responsibilities as the "part" of the input it is responsible for, and its vector of outgoing weights (the p[ ][j] values) as its preferred feature. In those terms then, the learning procedure is to make unit j's preferred feature directly more similar to the input part to which it was assigned. The details of the method are given below.

Notice that in this embodiment, the networks 50 not only contain the feature detectors 28 (that is, the "hidden units"—possibly multiple layers of them), the networks 50 also are used to implement the memory 40. This is a beneficial outcome of using this type of unsupervised network: because the noisy-OR network used is designed to model its input environment, it is essentially a (lossy) memory of the past inputs from that environment on which it has been trained. Furthermore, if there are multiple layers of units, these will also be operable as multiple memories of the appropriate types: each layer of units, and its connections to the layer below it, implements a memory for patterns of activity over that lower layer. FIG. 3 indicates the use of the networks 50 in implementing the memory 40 by dataflow arrows in both directions between the two subsystems.

Implementation

As mentioned, the core of the first preferred embodiment is implemented in software on a general-purpose digital computer. Thus a conceptual mapping exists between the structural subsystem description of FIG. 3 and the concrete implementation description. This mapping is as follows.

The input signal 26 is implemented by the storage and subsequent retrieval from computer memory of a variable INPUT[ ] (note that the term "computer memory" should not be confused with the "memory 40", although the former is used in implementing the latter, of course). The feature detectors 28 include all the hidden units of the networks 50. The preferred features of the feature detectors 28 for a given network are stored in computer memory as an array variable WEIGHT[ ][ ][ ]. The feature description signal 32 is implemented by storage and retrieval of appropriate elements of the WEIGHT array from computer memory. The feature activity signal 30 is implemented with the storage and retrieval of an array ACT[ ][ ]. Implementation of the feature detectors 28 includes program code which computes the elements of ACT[ ][ ], using Gibbs sampling. The classifier 34 is implemented by program code which computes a value for the variable OUTPUT; this includes code for computing individual network likelihoods, which are combined to produce OUTPUT. Storage and retrieval of OUTPUT implements the output signal 36.

The memory 40 includes the code which performs Gibbs sampling to elicit likely network (ACT[ ][ ]) states. Implementation of the retrieval signal 68 includes storage and retrieval of PROBOFF variables for the network units. The memory 40 makes use of the feature activity signal 30 in computing the retrieval signal 68 (PROBOFF values). As will be elaborated below, the PROBOFF values for a given layer are a (particular kind of) combination of WEIGHT values from the feature detectors 28 in the layer above. Thus the memory 40 is a lossy memory, since the WEIGHT values cannot in general store an arbitrary number of patterns without some loss of information.

The assigner 66 is implemented with code that computes responsibilities for the network connections. This code is part of the weight updating code of FIG. 9, which computes the responsibilities implicitly as described below. The part mapping signal 44 is implemented with temporary storage within the weight updating code of FIG. 9. This code block also implements the updater 42. The target signal 46 is implemented by a variable called TARGET, indicating the target class of the current physical pattern 22.

Architecture and Parameter Selection

Certain aspects of the system architecture will be determined by the problem to be solved. The number of networks, C, will be equal to the number of classes to be recognized (e.g., in recognizing lower case English letters, C would be 26). The number of input units (those in the bottom layer) will normally be the same for each of the networks, and will be determined by the input representation chosen. Recall that this representation is preferred to be 0/1 binary, but other than that, its composition is left to the designer. The creation of an appropriate input representation is a common task in the prior art pattern recognition literature.

Other aspects of the architecture will require educated guesses and possibly experimentation to achieve optimal performance. Again, this is characteristic of prior art devices as well. For example, the number of layers of units in each network could be varied. My experiments have only been performed with two- and three-layer networks (i.e., one and two layers of connections), but I have no reason to believe good results would not be obtained with more layers than this. Indeed, I believe more layers would be beneficial for many problems where the input domain contains large amounts of redundancy, such as raw images. The combination of this with the use of limited receptive fields (a technique now well known in the neural network literature) will probably be especially useful. As a general rule, the harder it is (for a person) to describe a class in terms of the input features, the more helpful it may be to have additional layers. However, a two-layer network is still preferred, with more layers added only if experimental resources allow. This also simplifies interpretation of the nomenclature herein: the activations of the single hidden layer are represented by the feature activity signal 30—that is, the hidden units correspond to the feature detectors 28—and the input units receive the elements of the input signal 26. The description herein considers the number of layers a variable, though (NUMLAYERS), to make experimentation with additional layers straightforward.

The numbers of units in each (non-input) layer are also parameters of the embodiment, as with prior art neural networks. The first number tried should be the best guess at the number of independent features in the input domain ("input domain" here means the activities of the next lower layer of units). A typical method of experimentation is to start with a very small number of units in each hidden layer, and increase the number after each training run, as long as performance of a trained system (on a cross-validation data set) improves and experimentation time allows. It is also typical to find better overall performance when the number of units decreases from a given lower layer to an upper layer. This is because one job of the unsupervised network is to remove redundancy, and fewer units are required to represent the same information, as more redundancy is removed.

Because my preferred embodiment is strictly layered, with no connections which "skip" a layer, it is convenient to view the weight values for a given network as a three-dimensional matrix, where the first index corresponds to the layer number, the second to the receiving (lower layer) unit, and the third to the sending (upper layer) unit. Thus I will use the variable WEIGHT[LAY][i][j] to represent the weight value from unit j in layer LAY+1 to unit i in layer LAY (where the layers are indexed starting with 0 for the input layer).

Regulation of Trials (Pattern Presentations)

As shown in FIG. 4, the overall course of learning and recognition is divided into trials, each trial involving the presentation of a single input pattern. Generally speaking, the user and the problem being addressed will determine on which trials learning and/or recognition will be enabled. Obviously, recognition will not be very good to the extent that learning has not occurred. Preferably though, classification error should be evaluated throughout learning on a separate cross-validation data set, and learning (which is done on a training data set, not the cross-validation set) terminated when the cross-validation error bottoms out and begins to increase. This technique is well known in the art. Other techniques may also be useful, however. For example, learning might be enabled throughout the lifetime of the device, perhaps to allow continual adaptation to a nonstationary environment (in such a case, it would be inappropriate to decrease the learning rate over time, though—see below).

Training patterns should be chosen independently and at random according to the input distribution to be learned. Note that the memory 40, which is implemented using the feature detectors 28 in this embodiment, does not contain any patterns at first (although the initial random weights could be viewed as representing hypothetical stored patterns). After one or more training trials, however, it is considered to have approximately stored the trained patterns. These stored patterns thus become the comparison patterns for future training trials, and are used in finding likely features or parts within each future input signal 26.

Before any learning, all weights (p[i][j] values) of all C networks should be initialized to small random values. These are stored in the array elements WEIGHT[LAY][i][j]. Preferably these should be uniform random in the range 0.02 to 0.04, but this could be an experimental parameter if resources allow such experimentation. During learning, the weights are preferably maintained in the range 0.01 to 0.99 (by resetting any weight that is beyond a limit back to that limit, after normal weight updating). The purpose of this is to prevent learning becoming "stuck" due to extremely low likelihoods, and to help prevent computed probabilities from exceeding machine-representable values. However, if experimentation is possible, and it is known or believed that important features in the input domain may occur with probabilities beyond this range, then these limits should be adjusted to compensate.

There are two variables for each unit i, COUNT[i] and COUNTBIAS[i], which are used to count training trials, as further explained below. These must be initialized to zero before any training trials are performed.

On each trial for which training is enabled, a variable TARGET is set to the index of the target class for the current physical pattern 22. A test will be performed during the loop over networks (as shown in FIG. 4) to determine if the current class, c, is equal to TARGET. If so, processing, including training, will continue on network c.

Regulation of Cycles (Gibbs Sampling Iterations)

As shown in FIG. 4, an important part of each trial is a loop over "cycles". This is done separately for each enabled network (just the target class network, if only training is enabled, and all class networks if recognition is enabled). The process is the same for each network, though, so here it will be discussed in the context of a single network.

Each cycle includes a single Gibbs sampling of each unit in the network, as well as a computation of the likelihood of the activation state produced. Also, two variables for each unit, PROBOFF and NETOFFBELOW, which are described below, are updated on each cycle. If training mode is enabled, weights are also updated on each cycle.

The reader is referred to the prior art literature to review the theory behind Gibbs sampling. The basic idea, though, is that each unit's activation is periodically sampled according to its probability conditional on the current activations of all the other units. Eventually, using this procedure, each overall network state will occur approximately with a frequency according to its overall probability (given the instantiated network input). This is a useful property because it is often very difficult to directly compute the probability of a network state conditional on a given input.

Each time a unit's activation is sampled, two values must be computed: the probability of the entire network (given all current values of the other units) if the unit were to have activation 0, and the probability of the network if the unit had activation 1. The probability that Gibbs sampling will assign the unit an activation of 0 is just the first of these two values, divided by their sum. If a 0 activation isn't assigned, then the unit takes on a value of 1.

A theoretically equivalent way of doing the same thing is to compute the probability that a unit's activation should change. This is the method of my preferred embodiment. It turns out with the noisy-OR architecture that a given unit will only be affected by a certain group of other units. In particular, a unit's parents, and children, and "siblings" (other parents of its children) are the only ones which need be considered when sampling a unit's activation.

My preferred embodiment employs a strategy which is a further improvement over a straightforward implementation of Gibbs sampling. This strategy takes advantage of the fact that many computed values do not change from one cycle to the next, especially on later cycles. Thus, an "update" strategy is employed, whereby certain useful quantities are maintained from cycle to cycle, and updated whenever other changes in the network state require. These updates typically consume less processing time overall than would recomputing the values on each cycle.

Two main variables are maintained for each unit, designated herein as PROBOFF and NETOFFBELOW. The PROBOFF value for a unit represents the probability that a unit is off given its parents—a quantity which is very useful in computing a unit's probability conditional on the rest of the network. Since computation of PROBOFF involves a product over the unit's "on" parents, it only needs to be updated when the activation of a parent unit changes, or the connection weight from a parent changes. Furthermore, the update need only deal with the changed parent activation, rather than iterating over all parents again.

Whereas PROBOFF may be considered a contribution from a unit's parents to its activation probability, the NETOFFBELOW value for a unit stores the contribution from "off" child units. It only needs to be changed when a child's activation changes, or a connection weight to a child changes. This value is very useful because in computing a unit's probability, the contribution from all "off" child units is computed by simply summing NETOFFBELOW with contributions from other units. Furthermore, NETOFFBELOW is itself just a sum of (negative) logs of the appropriate 1−p[i][j] values; i.e., it requires no multiplications or divides to compute (a table lookup could be used to speed up the log operation, and/or each connection's −log(1−p[i][j]) value could simply be stored). The overall implication of this is that the contribution from "off" children is very fast to compute. Moreover, in many applications the ratio of "off" to "on" units may be considerably higher than 1.0. To the extent this is true, the overall time to perform Gibbs sampling can be much faster with my method.

Initialization Before Gibbs Cycles

Figure 5:
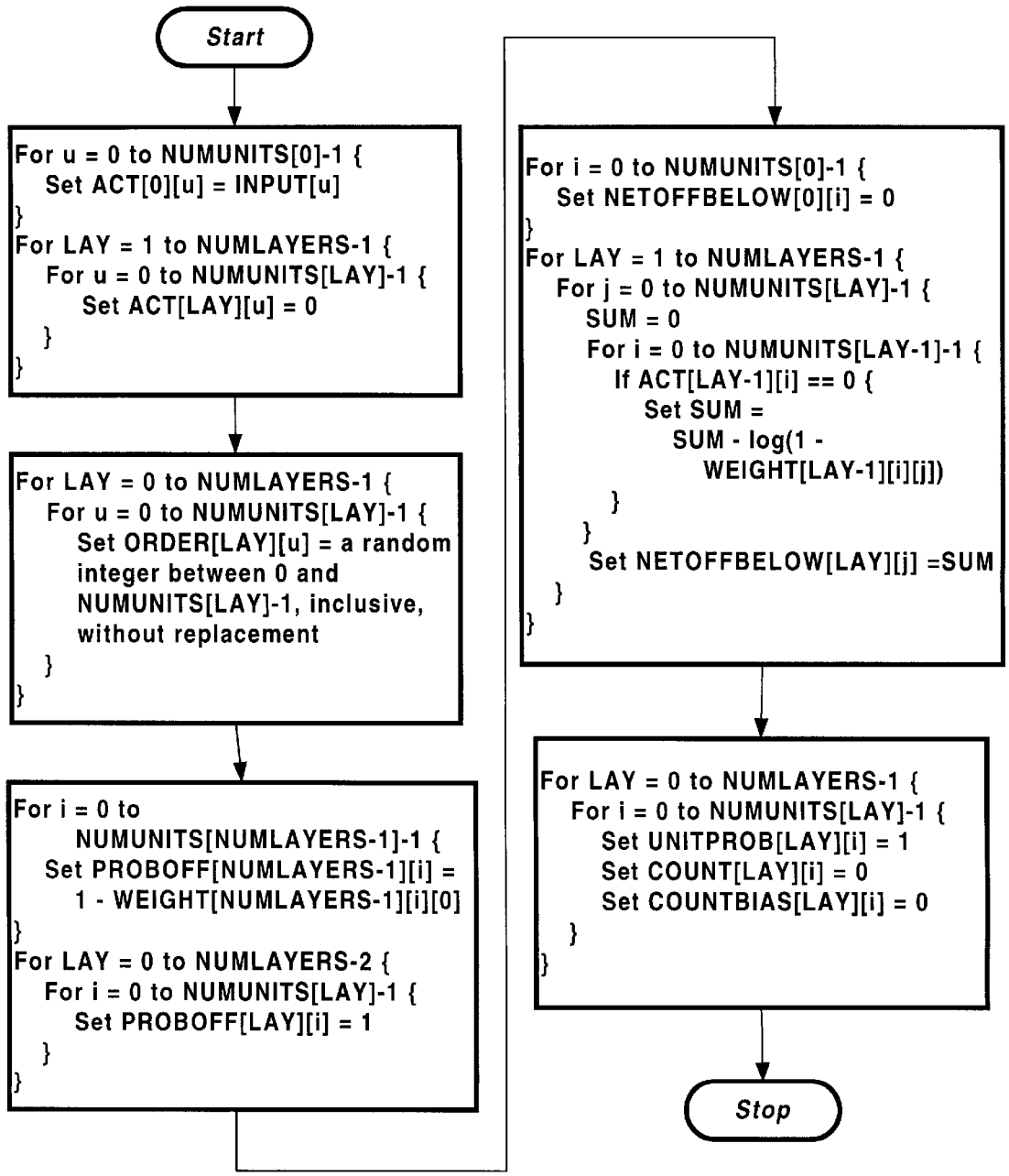
FIG. 5 is a flow diagram depicting the initialization of parameters for the first preferred embodiment.

Before any cycles occur, certain variables are initialized, as shown in FIG. 5. The activations of the input layer, represented by the variables ACT[0][0] . . . ACT[0][N−1], are set to be equal to the input pattern as stored in the array INPUT[0] . . . INPUT[N−1]. These values will be "clamped" during Gibbs sampling, meaning they are unchanged (not sampled). However, in other embodiments, in which some input values are missing, it would be appropriate to allow the missing values to be "filled in" by Gibbs sampling, by treating the corresponding input units like the network's hidden (non-input) units. For each non-input layer, all the unit activations are initialized to zero.

Also before cycling, a random sampling order is chosen for each layer of the network. This is simply a (uniform) random permutation of the unit indices of the layer, which is used as the order to perform Gibbs sampling within the layer. These indices are stored as the variable ORDER [LAY][ ], where LAY is the layer index, and the other index ranges over the units in that layer. Note that it may work well to use a different random order on each cycle, but my tests have not done this, and it requires somewhat more time, so it is not the preferred method.

The PROBOFF values for the units are initialized as follows. For the top layer in the network (layer number NUMLAYERS-1, where the bottom layer is layer zero), the PROBOFF value for each unit is just 1.0 minus the bias weight for the unit; that is, PROBOFF[NUMLAYERS−1][i]=1.0−WEIGHT[NUMLAYERS−1][i][0]. (Note the bias unit is considered to be a fictitious unit 0 in layer NUMLAYERS.) For each non-top layer, all of its units' PROBOFF values are initialized to 1.0, reflecting the fact that all non-input units are initially off.

The NETOFFBELOW variable for each unit is initialized as follows. For units with no children (input units), NETOFFBELOW is set to zero (and is always zero). For each other unit j in a non-input layer LAY, NETOFFBELOW is the sum over inactive child units i of −log(1.0−WEIGHT[LAY−1][i][j]). (Note this is the natural logarithm, i.e. base e.) Note that since all but the input units start out with activations of zero, all but the units in layer 1 (parents of the input units) will compute this sum over all their children.

The UNITPROB variable for each unit is initialized to one, for all units. This variable will be used to accumulate the (product of the) units' individual contributions to the overall network likelihood, which is computed over the course of all the cycles performed.

Two other variables are used for each unit as well: COUNT and COUNTBIAS. These are used to keep track of the number of training cycles for which the unit has been active (for COUNT) or has been either active or inactive (for COUNTBIAS). These variables are used in training, to reduce the amount of feature modification which is done over time, thus helping the training process to converge.

Gibbs Sampling and Unit Variable Updating

FIG. 6 (along with FIG. 7) illustrates the Gibbs sampling process for a single cycle, in more detail. The overall structure is two nested loops, the outer loop iterating over layers in the network (bottom to top), and the inner one iterating over units within each layer. The majority of the processing, as described next, occurs for a particular unit, the index of which is chosen from the permuted index list ORDER[LAY][u].

Figure 7:
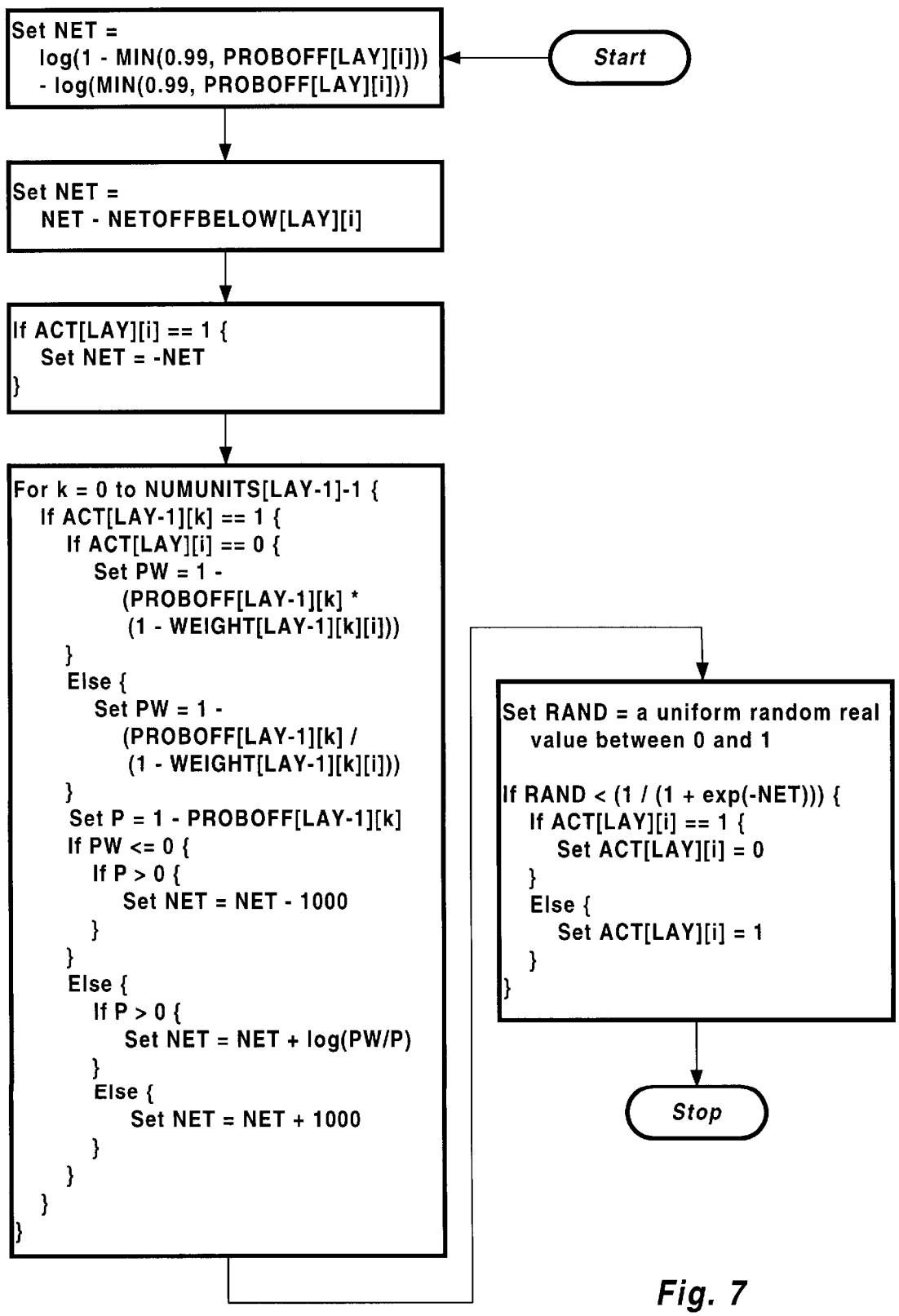
FIG. 7 is a flow diagram of a procedure for selecting a new unit activation within a cycle of the Gibbs sampling process of the first preferred embodiment.

The process for sampling a value for the current unit's activation, stored in ACT[LAY][i], is illustrated in FIG. 7. Note that, as illustrated in FIG. 6, no sampling is done on units with clamped activations. In my preferred embodiment all the input units' activations are clamped, and no other units are clamped. However, a distinction between "clamped" and "input" units is made here to assist those skilled in the art who may wish to experiment with alternative embodiments in which this is not true.

The strategy behind the procedure in FIG. 7 is to compute the probability that the current unit should change its activation, based on all the other units' current activations. The variable NET is used to accumulate "evidence" for the necessity of an activation change. NET is used as input to a sigmoid function, which outputs the probability of change.

This probability value is compared to a random real value between 0 and 1 inclusive to determine if a change is actually made.

NET is initialized using the contribution from the current unit's parent units. Most of the computation which goes into this has already been done, in the ongoing updates of the PROBOFF value for the current unit. The contribution is, theoretically, the (natural) log of (1−PROBOFF), minus the log of PROBOFF. This assumes that the current activation is zero; if it is not, the contribution must be multiplied by −1.

Notice that an adjustment is made to the theoretical value, though. In particular, instead of using PROBOFF directly, we use the smaller of PROBOFF and a constant, 0.99. This is done for the same reasons that the weights are clipped: to prevent problems of machine representation of small numbers, and to keep the Gibbs sampling from getting "stuck" due to extreme probabilities. Once again, though, if there is a reason to believe that this value 0.99 is too restrictive given the problem at hand, then experimentation should be done with a less restrictive (larger) value.

The second contribution to NET comes from the child units which are "off". Again, this has essentially already been computed via our scheme of updating, this time in the variable NETOFFBELOW. In particular, NETOFFBELOW is subtracted from NET. This assumes again that the current unit is "off". If it is not, NETOFFBELOW should be added to NET; this is done by the following conditional, as shown in FIG. 7.

The contribution from "on" child units cannot be easily computed from running variables, as can the other contributions; it must be recomputed each time by iterating over all the (on) child units. This is done next in FIG. 7. For each "on" child unit, we must compute the probability of that child having its current value, under two scenarios: (1) the current unit's activation changes, and (2) it doesn't change. In fact, it is the log of the ratio of these two probabilities which is added to NET, for each "on" child. This basic procedure is somewhat complicated by some enclosing conditionals. The purpose of these conditionals is just to handle the abnormal cases wherein one or the other, or both, of the probabilities is zero.

As shown in FIG. 6, once an activation has been selected for the current unit (ACT[LAY][i]), a check is done to see whether the activation changed (the previous value must have been stored, of course). If it has changed, then the running variables PROBOFF and NETOFFBELOW must be updated for all other units which might be affected.

The PROBOFF value for a unit keeps track of its probability of being off, given its parents. Thus any units in layer LAY−1 need to have their PROBOFF value updated (of course if LAY is the input layer, there will be no such units). For each child unit k, this is done by either multiplying or dividing PROBOFF[LAY−1][k] by the probability that unit i would not turn unit k on—that is, by the quantity 1−WEIGHT[LAY−1][k][i]. Whether a multiplication or a division is performed depends on whether unit i is now off or is now on. Notice that topmost layer units will never have their PROBOFF values changed during cycling, because their only parent is the (hypothetical) bias unit, which has a constant activation of 1.

The NETOFFBELOW value for a unit i keeps track of the contribution to its probability from its "off" children. Thus any units in layer LAY+1 need to have their NETOFFBELOW value updated, since unit i in layer LAY has now changed its activation (of course if LAY is the topmost layer, their will be no such units). For each parent unit j, this is done by either adding to or subtracting from the variable NETOFFBELOW[LAY+1][j], the quantity −log(1−WEIGHT[LAY][i][j]). Whether an addition or a subtraction is performed depends on whether unit i is now off or on.

After performing Gibbs sampling for all the units, another double loop is performed as shown in FIG. 8. Each unit in the network is again visited in turn (random index selection is not necessary here), and the UNITPROB value for each unit is updated. UNITPROB is ultimately used to estimate the likelihood of the entire network model, based on the current input pattern. This likelihood is the product of the individual unit probabilities (the probability each has its current activation, given the input). Furthermore, this quantity should be computed over a reasonably large sample of Gibbs cycles. My preferred method is to compute it over all the cycles (which is 20, preferably). Thus on each cycle, each unit's UNITPROB is simply multiplied by its PROBOFF value, if it is off, or 1 minus its PROBOFF value, if it is on (the UNITPROBs were initialized with value 1), as shown in FIG. 8.

In practice, it may be preferable to do the UNITPROB computation in the log-probability domain, however, since multiplying many probability values together can create numbers which are too small to represent on some computers. In this case UNITPROB would be a sum of logs (initialized to zero) and the update would be to add log (PROBOFF) if the unit is off, and add log(1−PROBOFF) if the unit is on. While this procedure may avoid representation problems, it will also require more computation unless a log lookup table is used.

To the extent experimentation is possible, it may also be useful to try computing UNITPROB values just over the later cycles, for example just the last half of the cycles. This could potentially produce a more accurate estimate of the true network likelihood, because the Gibbs sampling will have had more time to settle toward the true distribution. However, there is a tradeoff when the total number of cycles is limited (as it must be in practice), because reducing the number of cycles used to do the estimation also reduces the quality of the estimate. Experimentation is the only way to find an optimal tradeoff; however, I believe my method will produce good estimates in general.

Feature Modification

After Gibbs sampling of each unit, and updating of appropriate running variables, feature modification (learning) occurs for the cycle, as shown in FIG. 9. Of course, this is assuming that training mode is enabled; if the system were in recognition-only mode, no feature modification would take place.

The first step shown in FIG. 9 is to set a learning rate variable, LRATE, to 1.0. Since LRATE gets multiplied by each potential weight change, using a value of 1.0 is equivalent to not using a learning rate at all. However, one is used here because certain modifications of the preferred embodiment might require one, so it is useful to illustrate how LRATE should be used in the more general case.

As with Gibbs sampling and the updating of UNITPROB values, learning is done within a nested double-loop, over layers and units within each layer. The units are visited in turn, rather than according to a random index order, in my preferred embodiment. However, if experimentation is possible, I advise trying a modified embodiment in which the units within a layer are visited in a different random order on each cycle. This is because PROBOFF values for the layer below are modified during training of a unit, and this affects future training of other units in the layer. Thus, in my embodiment there is a bias according to a unit's index. While I don't believe it would make a significant improvement to remove this bias with random indexes, it is possible that it could for some recognition tasks.

As each unit is visited, 0.05 is first added to its COUNTBIAS value. This variable keeps track of the number of trials of learning which the unit has "experienced" so far. The value is 0.05 because 20 cycles are used in my preferred embodiment, and 0.05=1/20. A similar variable, COUNT, keeps track of just the number of training trials for which the unit was active. COUNT is updated within the conditional described next.

The weights leaving a given unit i (those to the layer below) are only modified if unit i is active. If it is, its COUNT variable is updated as just mentioned, and then a loop is entered to iterate over child units of i.

For each child k of unit i, we can compute an associated "responsibility" value, representing the responsibility unit i had in causing k to be active. If k is not active, this responsibility is zero. Otherwise, the responsibility is determined by dividing WEIGHT[LAY-1][k][i] by the quantity 1-PROBOFF[LAY-1][k]. This is essentially the prior probability that unit i would turn k on (WEIGHT[LAY-1][k][i]), divided by the prior probability that k would be on given all its parents' current activations. Note that we say "prior" here, because these probabilities do not take into account whether or not k is actually on as a result of Gibbs sampling.

The array of responsibilities for all of unit i's children constitutes the "part" of the pattern of activity in the child layer which has been assigned to unit i. The goal of learning is to move unit i's preferred feature—namely, its vector of weights going to its children—toward its assigned part. Thus we can view the vector of i's responsibilities as the "target" toward which we want its weights to be modified.

The upshot of this, in terms of an actual procedure for each weight, is that WEIGHT[LAY-1][k][i] should be moved toward zero, if unit k is not active on this Gibbs cycle, and towards WEIGHT[LAY-1][k][i]/(1-PROBOFF[LAY-1][k]) otherwise. (Remember that no changes are made at all unless unit i is active.) This is what the procedure of FIG. 9 does, although it does not explicitly compute the responsibility (target) value. Furthermore, the actual amount of the change is determined by LRATE and the COUNT value for unit i.

I believe the procedure of reducing the effective learning rate (i.e., LRATE/COUNT) using COUNT is the best way to achieve a balance of fast learning and convergence toward a stable solution. However, there are two related situations where this would not be so appropriate, and thus these situations are not preferred applications of my preferred embodiment. The first situation is where input patterns for the recognition system are not chosen independently and at random. The second situation is where the patterns are chosen at random, but the distribution changes over time (is "nonstationary"). In either of these cases, there could be an unwanted "primacy effect" due to the fact that more training is done on earlier patterns than on later ones. Although I do not recommend applying my preferred embodiment to such cases, if it were to be attempted, I believe the most appropriate approach would be to use a constant LRATE of considerably less than 1.0, and to not divide by COUNT.

After a weight is updated, it is then clipped to lie in the range 0.01 to 0.99, as discussed previously. Also, the PROBOFF and NETOFFBELOW values which depend on the just-modified weight are updated as appropriate. Note that while this might seem to incur a lot of computation, since there are so many weights, and a multiply and a divide are required each time, the situation is not as bad as it first appears. This is because learning only takes place for weights from an active unit, and furthermore in many applications there will be fewer active units than inactive ones.

Once a unit's outgoing weights have been modified (or not, if it was not active), a test is made to decide if its bias weight should be modified. Only topmost units even use a bias in my preferred embodiment, so that is one condition of the test. Also, bias weights are only updated on the last of the (20) cycles. For the most part, updating a bias is the same as updating any other weight. There is no need to test if the parent unit is active, though, because the bias unit is always active, albeit in a hypothetical sense.

Another exception is that my preferred embodiment maintains bias weights in the range 0.01 to 0.25. This is because my experiments showed that allowing a bias to grow too large could allow it to "dominate" the others: it would grow large, and would thereby take responsibility for nearly all inputs, thus creating a vicious circle in which other units could never "win" any inputs. However, as with the range limitation of the other weights, if there is reason to believe that the top-level "true" features in the pattern domain can occur with probability greater than 0.25, experimentation with an appropriately increased maximum should be done insofar as possible.

When a bias is changed, the PROBOFF value for the unit must also be updated. Since only topmost units have biases, though, and they have no other incoming connections other than biases, this is a simple update procedure, as FIG. 9 indicates.

Exiting the Cycle Loop

As shown in FIG. 4, once a cycle of Gibbs sampling has been done, along with the corresponding updates of weights and other variables (such as PROBOFFs), a check is made to decide whether to exit the cycle loop. In my preferred embodiment, as mentioned above, the loop is exited after 20 cycles have been performed. Another possible embodiment, though, would be to exit the cycle loop as soon as the amount of changes to the unit activations has become small, according to some measure. For example, the loop might be quit after two complete cycles had failed to produce any activation changes, or after 5 cycles wherein less than 2 percent of the unit activations changed. Obviously there are an unlimited number of similar strategies.

Such an alternative embodiment would have the advantage that when one interpretation of the input (i.e., one set of network activations) is much more likely than the rest, very little cycling would be required. This could often be the case once extensive training has already been done. However, one would need to deal with the issue of how much training to do on each cycle, given that a different number of cycles would be done on different patterns (this could be especially tricky for bias weights). Also, some maximum number of cycles would still need to be set. These added complications are the main reasons that I do not prefer such an embodiment.

System Output Determination

Compute a Relative Probability for the Network

As mentioned above, the Gibbs cycling process (including weight and variable updating) is the same for each network in the recognition system. This is also true of computation of a network probability value, which takes place after the cycling, unless only training mode is active, in which case the probability value is unnecessary. The probability of network c is stored in the variable NETWORKPROB[c] once computed, which will be used in computing an output for the overall recognition system.

Computation of NETWORKPROB values is easy, given that we have already computed UNITPROB values for all the units in the network. NETWORKPROB[c] is just the product over all layers LAY and units i in network c of UNITPROB[LAY][i]. (Of course, if one were using the modified method described above of using log probabilities for UNITPROB, then NETWORKPROB[c] would be a sum of the UNITPROB values instead.) The NETWORKPROB [c] variable represents the probability of the network c model (as embodied by its architecture and modifiable weights, and as estimated here by a sampling of probable activation states) AND the input signal 26 (again, viewing the network as a generator of input signals). The NETWORKPROB values can thus be compared to see which is more probable for this particular input signal 26.

Setting OUTPUT

As shown in FIG. 4, once all networks in the system have been processed—for recognition, training, or both, depending on the system mode—the network loop is exited. If only training mode is enabled, processing is now complete for this input signal 26. However, if recognition mode is enabled, the system output must be determined.

The system output is stored as the variable OUTPUT[ ], and is simply the index of the network which is most probable, given the current input signal 26. (Note that OUTPUT[ ] is a single-element array here.) This index is then used as appropriate by the effector 38, as described previously. If, as is preferable, the classes in the pattern domain are equally probable a priori, OUTPUT is just the index of the network with the largest NETWORKPROB value.

It is often the case, though, that classes in the pattern domain have different prior probabilities. In this case, an estimate should be made of these probabilities ("priors"), and stored in the array CLASSPROB[ ]. Then, for each class c, NETWORKPROB[c] should be multiplied by CLASSPROB[c], with the result stored in NETWORKPROB[c] (unless logs were used for the UNITPROBs and NETWORKPROBs, in which case the log of the CLASSPROBs should be added to the corresponding NETWORKPROB values). The NETWORKPROB values can then be compared in the same way as if the prior probabilities were equal.

Once the appropriate action 70 is taken based on OUTPUT[ ], processing of the current input signal 26 is complete. The next step is to (potentially) select a new input signal 26, and repeat the processing for a trial (see "Regulation of trials" section above).

Preferred Embodiment 2

Architecture Figure and Flow Diagram

Figure 11:
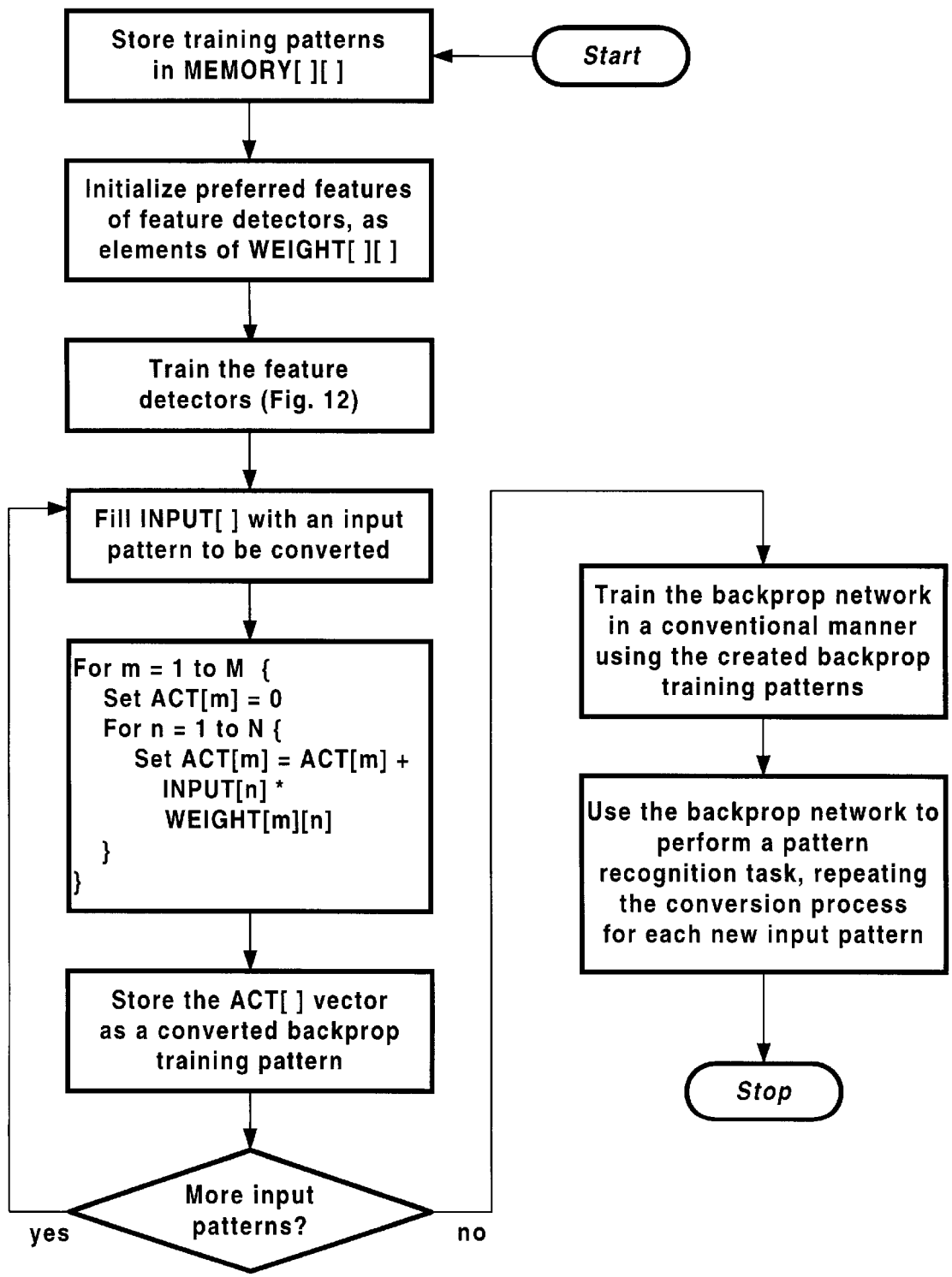
FIG. 11 is a flow diagram of an overall procedure for operating the second preferred embodiment.
Figure 12:
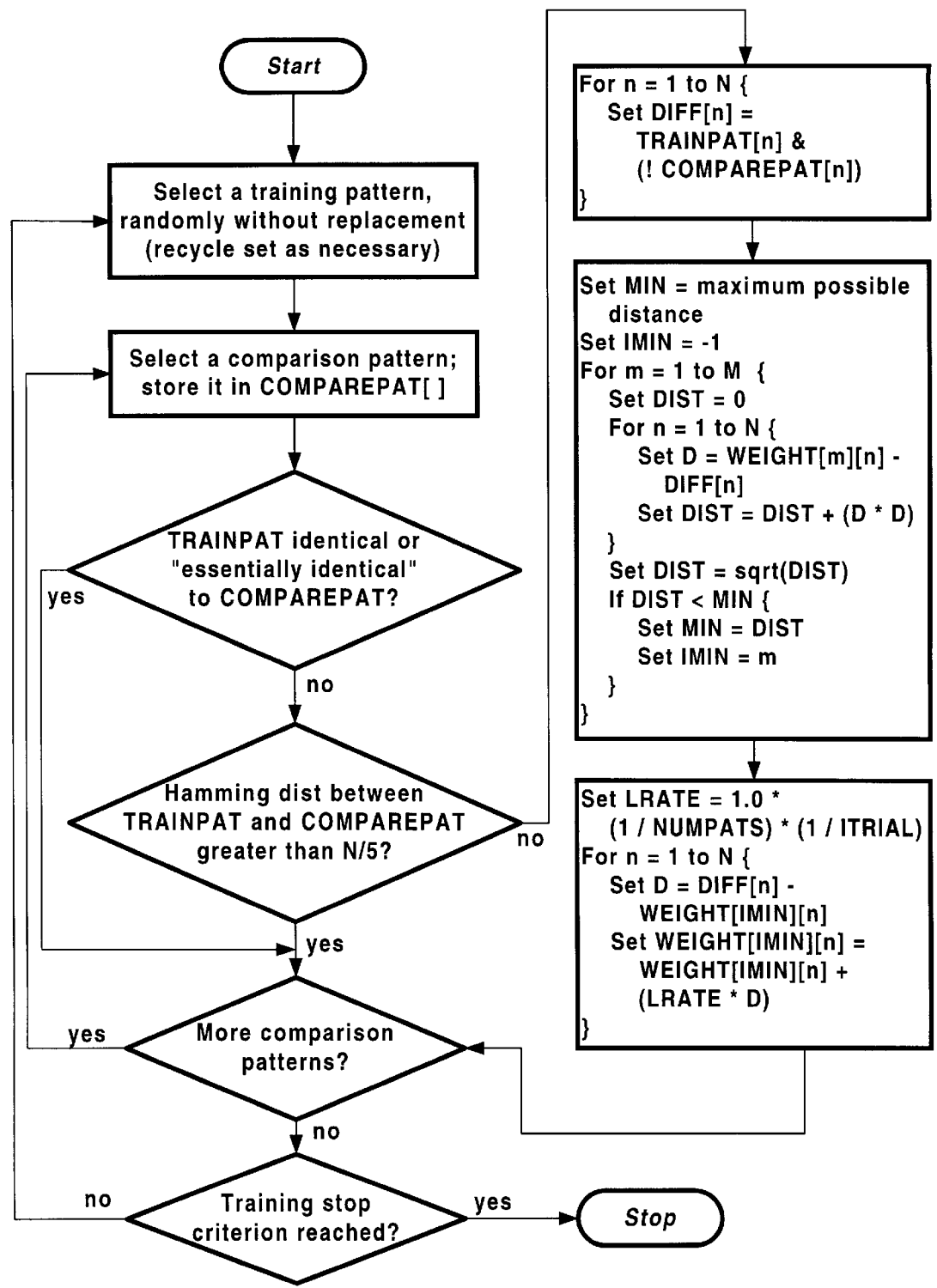
FIG. 12 is a flow diagram of a procedure for training the feature detectors of the second preferred embodiment.

My second preferred embodiment is described with reference to FIGS. 10 through 12. FIG. 10 illustrates the structure of the second preferred embodiment in more detail than in FIG. 1. FIG. 11 provides a flow chart illustrating an outline of the software implementation in more detail than in FIG. 2, and FIG. 12 provides a more detailed flow chart of the steps involved in training the feature detectors 28.

Theory

My second preferred embodiment is different in many respects from the first preferred embodiment, and thus indicates to some extent the range of useful embodiments made possible by the invention. It uses independent feature learning to create a data compression device, which is then used as the front end to a (well-known) backpropagation network.

One way to make an intelligent guess as to what features are contained in a pattern is to use the existing feature detectors to segment it; this is the technique used by my first embodiment. Another way, though, is to use actual previous patterns, stored in memory; this is the approach used by my second embodiment. The heuristic underlying this strategy is the following: A feature could be defined as that which distinguishes two similar, but nonidentical, patterns—i.e., the "difference" between them. Therefore, a reasonable way to find likely features in a pattern is to compare it to stored patterns which are similar but not identical, and to compute some sort of difference for each such comparison. Having done this, the likely features—which are "parts", in the terminology of this invention specification—can be used to train the existing feature detectors.

The overall approach of the second preferred embodiment, then, is the following. The memory 40 is used to store, in a lossless manner, a large number of "comparison" patterns from the input domain to be learned. Each new pattern which is input is compared to one or more comparison pattern, and a difference vector DIFF[ ] is generated for each comparison. The assigner 66 compares each difference vector (part) to the preferred feature of each feature detector 28[$m$], as communicated by the feature description signal 32[$m$]. The detector 28[$m$] which best matches the difference vector "wins" that difference vector, and this information is communicated to the updater 42 via the part mapping signal 44. The updater 42 moves the winning detector's preferred feature toward the difference vector which it won, by some amount.

After a sufficient amount of such training, the feature detectors 28 are used as an input layer to a backpropagation based neural network, which plays the role of the classifier 34. This is done by making the feature activity signal 30 the input to the backprop network, and having each of the feature detectors 28 become active to the extent that it's preferred feature is found in a subsequent new input signal 26. Conventional supervised training is then done on the backprop network using these pretrained feature detectors 28. The result is a pattern recognition system which requires fewer resources due to the learned data compression input layer. Furthermore, since the trained feature detectors 28 represent valuable information about the pattern domain, their preferred features may be copied or otherwise transferred to a comparable recognition system in order to avoid training the comparable system.

Because the memory 40 and feature detectors 28 are separate in this embodiment, the segmentation into parts (likely features) is likely to be not as good overall as that of embodiments (such as my first preferred one) which tightly integrate these two subsystems. Also, data compression is a lossy procedure, and as with other unsupervised procedures, there is no inherent way of forcing the learning of features which are relevant for the classification task at hand. For these reasons, this embodiment especially should be used as a tool, and only when experimentation is possible—not as a "quick-fix" solution for a mission-critical task. Of course, this is true to some extent of all adaptive pattern recognizers, including my first preferred embodiment, to the extent that the pattern domain is not well-understood.

While this embodiment lacks a tight integration of feature detectors 28 and memory 40, it is also somewhat more simple to implement than embodiments such as my first preferred one. Furthermore, it allows a very wide variety of backprop networks to be used as the classifier 34, which makes it a very flexible and powerful pattern recognition tool.

Implementation

As mentioned, the core of the second preferred embodiment is implemented in software on a general-purpose digital computer. Thus a conceptual mapping exists between the structural subsystem description of FIG. 10 and the concrete implementation description. This mapping is as follows.

The input signal 26 is implemented by the storage and subsequent retrieval from computer memory of a variable INPUT[ ] (note that the term "computer memory" should not be confused with the "memory 40", although the former is used in implementing the latter, of course). The preferred features of the feature detectors 28 are stored in computer memory as an array variable WEIGHT[ ][ ][ ]. The feature description signal 32 is implemented by storage and retrieval of appropriate elements of the WEIGHT array from computer memory. The feature activity signal 30 is implemented with the storage and retrieval of an array ACT[ ]. Implementation of the feature detectors 28 includes program code which computes the value of ACT[ ]. The classifier 34 is implemented by program code which provides the functionality of a (conventional) backpropagation network. This backprop program code computes a value for the variable OUTPUT. Storage and retrieval of OUTPUT implements the output signal 36.

The memory 40 includes computer storage and program code for storing, in their entirety, a sequence of training patterns, each represented by a distinct input signal 26. Implementation of the retrieval signal 68 includes storage and retrieval of COMPAREPAT values, each of which represents a "comparison" pattern, and is one of the training patterns. The assigner 66 implementation includes code that computes a difference between a current training pattern, TRAINPAT, and a current comparison pattern, COMPAREPAT. It also includes storage for a variable DIFF[ ], representing this difference. It further includes code for finding the feature detector 28[IMIN] whose preferred feature best matches DIFF[ ]. The part mapping signal 44 is implemented by storage and retrieval of the variables DIFF[ ] and WEIGHT[IMIN][ ]. The updater 42 implementation includes code for modifying WEIGHT[IMIN][ ] in the direction of DIFF[ ].

Architecture and Parameter Selection

Certain aspects of the system architecture will be determined by the problem to be solved. The number of input units (those in the bottom layer) will be determined by the input representation chosen. Recall that this representation is preferred to be 0/1 binary, but other than that, its composition is left to the designer. The creation of an appropriate input representation is a common task in the prior art pattern recognition literature.

This embodiment only has one layer of independent feature learning, which includes the weights to the feature detectors 28 from the input units (whose activities are communicated by the input signal 26); these weights embody the preferred features, and will be stored as the variable WEIGHT[ ][ ]. However, the backprop network architecture may have multiple layers of connections. The considerations here will be the same as those in the prior art for backprop nets, with the extra consideration that the inputs to the backprop net will come from a data compression layer. If anything, this may eliminate the need for one layer of a backprop net which would have been used without data compression; but preferably the backprop architecture should not be changed from what it would have been without data compression.

The number of feature detectors 28 to use in the unsupervised layer—which corresponds to the number of input units in the backprop part of the system—is a parameter which will require experimentation to achieve an optimal value. This is characteristic of prior art devices as well, when they have hidden units. Normally the number should be less than the number N of input units in the unsupervised network; otherwise, there is no data compression occurring. The first number tried should be the best guess at the number of independent features in the input domain. A typical method of experimentation is to start with a very small number of units in the layer, and increase the number after each training run, as long as performance of a trained system (on a cross-validation data set) improves and experimentation time allows.

The backprop layers may be constructed in accordance with any compatible feedforward backprop network to be found in the prior art (to be compatible, the backprop architecture must allow M real-valued inputs, of magnitude possibly greater than one). The inputs to the backprop network will be the transformed input signals 26, where the transformation uses the feature detectors 28; that is, the input to the backprop net will be the set of feature activity signal elements 30[$m$]. Note that for a typical backprop network, a target signal 46 will be required for each input signal 26, representing the desired output signal 36 for that input signal 26.

Some good backpropagation reference material, as well as references to further relevant background, may be found in the following sources: *The Handbook of Brain Theory and Neural Networks* (cited above); *Introduction to the Theory of Neural Computation*, by Hertz, Krogh, & Palmer (1991, Addison-Wesley, Redwood City, Calif.; and *Neural Networks for Pattern Recognition*, by C. M. Bishop (1995, Oxford University Press, Oxford, G.B.).

Numerous commercial software packages are available to assist in implementing backpropagation (and the rest of my preferred embodiment, in some cases) in computer software. One especially powerful and flexible one which is currently available for free (with certain copyright restrictions) is the PDP++ package by O'Reilly, Dawson, and McClelland. This package is available (at the time of this writing) from the Center for the Neural Basis of Cognition (a joint program between Carnegie Mellon University and The University of Pittsburgh) on the internet at http://www.cnbc.cmu.edu/PDP++/PDP++.html (also at http://einstein.lerc.nasa.gov/pdp++/pdp-user$_{13}$toc.html). The documentation for this package is also very useful for learning about backpropagation and its implementation using object oriented programming and the C++ language.

Regulation of Trials (Pattern Presentations)

The overall operation of the second preferred embodiment is illustrated in FIG. 11. As with the first preferred embodiment, operation of this one can be viewed as a sequence of trials, each of which includes presentation of a single input signal 26. Preferably the trials are divided into a set of training trials (i.e., with only training mode enabled), followed by a set of recognition trials (with only recognition enabled). One possible confusion here is that "recognition" is taken to include all operations performed with the backprop network—including training of the backprop net. Since this device does nothing special with respect to the backprop net, other than provide it with different inputs than it would otherwise have, backprop training will not be detailed, and is considered a "recognition" operation herein. I will specifically call it "backprop training" to distinguish it from "training", when necessary; the latter is meant to refer only to training of the unsupervised feature detectors 28 of my device.

Initialization Before Trials

Before any trials occur, the memory 40 is loaded with the training set. The memory 40 is implemented as a two-dimensional array variable MEMORY[ ][ ], where the first dimension ranges over patterns, and the second ranges over elements within a pattern. Note that MEMORY[ ][n] corresponds to INPUT[n].

Preferably all patterns in the training set are stored in the memory 40. However, if the training set is especially large, a non-preferred embodiment could be tried in which a random sample is chosen as the comparison patterns to store in the memory 40. If so, patterns in the sample should be chosen independently and at random according to their distribution in the pattern domain.

The preferred features of the feature detectors 28 are implemented using the array WEIGHT[ ][ ]. The first dimension of WEIGHT ranges over the M feature detectors 28, and the second ranges over the N input units. Note this is the reverse of the WEIGHT indexing scheme of the first preferred embodiment, because this embodiment is more naturally viewed as a pattern interpreter than a pattern generator (although both embodiments can be viewed in either way).

The weights must be initialized to small random values before any trials. Preferably they should be uniform random in the range 0.02 to 0.04, but this could be an experimental parameter if resources allow such experimentation. A possible improvement, which I have not tested, is to set the weight vector WEIGHT[$m$][ ] for each feature detector 28[$m$] to a small multiple of (e.g. 0.01 times) a randomly selected training pattern, and then add a small random number (e.g. between 0.02 and 0.03) to each weight (such that positive weights always result). Note that no range limitation is placed on the weights during learning as in the first preferred embodiment, although the learning procedure itself will maintain the weights within the 0 to 1 range.

Training Trials

The operation over training trials is illustrated in more detail in FIG. 12. On each training trial, a pattern is selected from the training set independently and at random according to the pattern domain distribution. Preferably this training pattern comes from the patterns stored in MEMORY. The training pattern is stored in the array TRAINPAT[ ].

Given a selected TRAINPAT, a loop is next performed over comparisons. Each comparison begins with the selection of a random pattern from MEMORY, and storage of it in the array COMPAREPAT[ ].

A test is performed on TRAINPAT and COMPAREPAT to determine if they are identical on every binary element. If so, COMPAREPAT is marked as "used" for this trial, and processing moves to the next comparison.

A second test determines whether TRAINPAT and COMPAREPAT differ only by "noise"; that is, whether they are "essentially identical". The definition of "noise" generally depends on the problem at hand, so to achieve optimal performance this test could be experimented with. If experimentation is not possible, however, my preferred test should be used, which is to reject differences with a Hamming distance (number of differing bits) of one. The purpose of this test, (which purpose should guide any experimental changes), is to reject those differences which don't represent a true feature of the pattern domain. If TRAINPAT and COMPAREPAT are judged to differ only by noise, COMPAREPAT is marked as "used" for this trial, and processing moves to the next comparison.

Another test is next performed which attempts to restrict the comparisons to differences of one, or at most a small number, of features. It is called the "dissimilarity test", because the goal is to throw out comparison patterns which are highly dissimilar from the training pattern. Ideally only pairs of patterns which differ by a single feature would be used, as these are best at indicating what the features of the pattern domain are. However, we can't identify the features a priori, so we can only use heuristics to guess at the number of differing features for a given pair of patterns.

My preferred dissimilarity test is to reject comparisons which have a Hamming distance greater than some fixed percentage of the number N of input units. I recommend using a value of 20%, as shown in FIG. 12. However, if experimental resources permit, a crude optimization of this value should be performed. (Note that the Hamming distance used should never be less than or equal to that of the "essential identity" test, or else all comparisons would be rejected! Such excessive restriction must also be avoided if other, non-preferred tests are used.) This preferred value of 20% assumes that the input patterns are not sparse—that is, that on average a roughly equal number of pattern elements are on as are off. If this is not true, the preferred value should be computed by determining the average number of "on" bits in a pattern, over the entire training set, and using 40% of that average number.

It must be emphasized that this test will not be perfect, even with an optimized percentage. The problem is that a true feature could conceivably consist of a very large number of input units. However, the alternative—a method which considers every non-identical pattern pair to differ by a single feature—is much less theoretically justified. Also, as always, if the system designer has some reason to believe that a particular value would be more appropriate for a given pattern domain than my suggested value, the designer's informed guess is preferred as the starting point for experimentation.

Assuming COMPAREPAT passes the identity, near-identity, and dissimilarity tests, a difference vector is computed and stored as the variable DIFF[ ]. DIFF is obtained by the bit-wise operation AND-NOT. For two boolean variables x and y, the value of x AND-NOT y is true (equals one) if and only if x is true and y is false. Thus, each element DIFF[n] is set to the value of TRAINPAT[n] AND-NOT COMPAREPAT[n].

A loop is next entered over the M feature detectors 28. For each such detector m, a variable DIST is computed which is the Euclidean distance between WEIGHT[$m$][ ] and DIFF[ ]. The minimum value of DIST over all feature detectors, and the index m corresponding to the minimum, are maintained in MIN and IMIN, respectively.

Once the minimum-distance feature detector 28[IMIN] is found, its preferred feature WEIGHT[IMIN][ ] is moved toward the current difference vector DIFF[ ]. Note that DIFF represents a "part" of TRAINPAT for which feature detector 28[IMIN] is taking responsibility.

The amount of learning done on each comparison is determined by LRATE, the learning rate. LRATE is equal to 1.0, times the reciprocal of the number of comparisons (including rejections) done on the trial (which equals NUMPATS, the number of training patterns, in my preferred embodiment), divided by ITRIAL, the index of the current trial (beginning with 1). For each element n of WEIGHT[IMIN][ ] and DIFF[ ], the difference DIFF[n]–WEIGHT[IMIN][n] is computed, and multiplied by LRATE, and the result added to WEIGHT[MIN][n].

The comparison loop continues in this fashion until all comparison patterns have been exhausted. New comparison patterns are chosen without replacement, so that each one from the comparison set in MEMORY is used once and only once for each TRAINPAT.

After all comparisons have been performed, and features updated, for this training pattern, a new training pattern is selected. TRAINPATs, like COMPAREPATs, are not replaced in the pool once selected, so that each will be used once and only once, until all NUMPATS patterns have been used (at which point training may continue on a new cycle through the training patterns).

Stopping the Learning Process

A decision is made at some point to stop learning. My preferred method for this is to keep track, for each training pattern, of the number of comparisons on which each feature detector wins. That is, a 2-D array NUMWINS[ ][ ] is maintained, where NUMWINS[$m$][t] is the number of times feature detector m won a comparison on trial t. The entire training set is presented repeatedly (as indicated by the "recycle set as necessary" instruction in FIG. 12), each iteration being as already described, until either (1) no element in the NUMWINS[ ][ ] array changes during the training set iteration, or (2) a maximum number of training set iterations is performed. The maximum could be experimented with, but my preferred value is 20.

Note that while this procedure requires multiple iterations through the training set, the trial index ITRIAL should not be reset, since it represents the total number of training trials which have occurred. Another index variable should be used to keep track of pattern presentations within a given training set iteration.

If experimental resources permit, it may be useful to try different criteria for stopping learning. This is especially true with large training sets, where learning may converge to an acceptable state within just one training set iteration. One such technique would be to maintain a running average for the MIN values (Euclidean distance between winning feature detector IMIN and the DIFF vector it wins), and stop learning when a plot of this running average reaches some criterion (small) slope.

Using the Backprop Network

Once training is finished, training mode is disabled and recognition mode is enabled. At this point, the particular backprop architecture and procedure employed will determine the order and manner in which patterns are selected. Recall that, as mentioned previously, training of the backprop network will now take place, but because the backprop network is a well-known module with respect to my device, all operations on it including training will be considered "recognition mode" herein.

All patterns in the training set must be converted for use by the backprop module, whether done all at once before training of the backprop net (as preferred, and as shown in FIG. 11), or one at a time during its training. Once it is trained, new patterns to be recognized must also be converted to allow proper recognition.

The conversion of patterns may be viewed as an input layer feeding into the backprop net—albeit an input layer which (now) has fixed weights, and different activation functions than the backprop net. In the terminology of this specification, the feature activity signal 30 forms the input to the backprop module. Thus I describe here how to produce this signal 30 for this embodiment, and leave the implementation of backprop up to the user. The considerations that go into the particular implementation of backprop used are the same as those in prior art backprop nets, except as noted herein.

As shown in FIG. 11, the feature activity signal 30 is stored as an array ACT[ ], and is determined as follows. The input pattern (signal 26) is stored in the array INPUT[ ]. The value for a given ACT[j] is computed as the inner product between the INPUT[ ] and WEIGHT[j][ ] vectors. (The inner product is also known as the dot product, and is a measure of the similarity of the two vectors.)

Note that the ACT values will be real numbers, and may fall beyond the range 0–1; in particular, they may range as high as the number of elements in the input, N. Such real valued inputs are not a problem in general for backpropagation networks. However, there are some specialized implementations of backprop which assume or prefer binary inputs or inputs which are less than or equal to one. Such implementations of backprop would not be appropriate for this preferred embodiment.

The output of the backprop network, stored as the array OUTPUT[ ], becomes the output signal 36. The activation values of the backprop network's output units might be used directly, e.g. as posterior probability estimates, or a classification index might be computed from them and used as the output signal 36 (in the latter case, OUTPUT[ ] would only be a one-element array). The exact method used depends on what type of effector 38 is used, and on the recognition problem being addressed; an appropriate method will be readily apparent to those skilled in the art, given a particular recognition task.

CONCLUSION, RAMIFICATIONS, AND SCOPE OF INVENTION

Thus the reader will see that a pattern recognition device according to the invention may be trained with fewer examples of physical patterns than prior art devices applied to the same task. Furthermore, the invention allows for improved generalization of learning given a relatively small training set. Still further, it allows for potentially improved scaling to relatively large architectures.

While my above description contains many specificities, these should not be construed as limitations on the scope of the invention, but rather as exemplifications of preferred embodiments thereof. Many other variations are possible. For example, neural network based embodiments could be used which are not strictly layered (i.e. have "layer skipping" connections), or which use some pattern of connectivity other than full connectivity between layers, such as limited receptive fields.

An embodiment similar to my first preferred embodiment might update weights simultaneously with Gibbs sampling; that is, each unit could be sampled and have its weights modified before moving on to another unit. More generally, a given feature detector 28[$a$] may be modified by the updater 42 before assignment of another part to another feature detector 28[$b$] takes place (this is true for virtually any other embodiment as well, including my second preferred embodiment).

Many other variations of the invention will become apparent to those skilled in the art, especially upon observing the relatively major differences between my two preferred embodiments.

Accordingly, the scope of the invention should be determined not by the embodiments illustrated and described, but by the appended claims and their legal equivalents.

What is claimed is:

1. A device for recognizing and responding to physical patterns, comprising:
    (a) transducer means for producing an input signal representing a physical pattern in an environment;
    (b) a plurality of feature detectors responsive to said input signal, each feature detector having weight means for storing a representation of a preferred feature, for producing a feature activity signal representing degrees to which each of said preferred features exists in said input signal, and for producing a feature description signal representing said preferred features;

(c) classifier means responsive to said feature activity signal, for producing an output signal representing a system action corresponding to said input signal;

(d) effector means responsive to said output signal, for committing an action in said environment;

(e) memory means responsive to said input signal, for approximately storing a representation of said input signal, and for producing a retrieval signal representing previously stored input signals;

(f) assigner means responsive to said input signal and to said retrieval signal and to said feature description signal, for producing a part mapping signal representing a mapping between a plurality of parts and at least one responsible feature detector, such that each part corresponds to a likely feature of said input signal and of said previously stored input signals;

(g) updater means responsive to said part mapping signal, for modifying each of said responsible feature detectors so as to make its preferred feature more similar to its assigned part;

whereby the modification of each of said responsible feature detectors is largely independent of the modifications of the other feature detectors;

whereby said device can be effectively trained with fewer physical pattern examples than a device having correlated feature training.

2. The device of claim 1 wherein said part mapping signal represents a mapping between said plurality of parts and a plurality of responsible feature detectors, and is such that each responsible feature detector has a high correspondence to its assigned part relative to the other feature detectors.

3. The device of claim 2 wherein said memory means is responsive to said feature activity signal and to said feature description signal, and said retrieval signal is dependent upon said feature activity signal and upon said feature description signal.

4. The device of claim 3 wherein said feature detectors, and said classifier means, and said memory means, and said assigner means, and said updater means comprise executable instruction code on a digital computing machine.

5. The device of claim 3 wherein said feature detectors are implemented with a neural network, such that the weight means for each feature detector comprises an array of modifiable connections configured for receiving said input signal.

6. The device of claim 5 wherein said neural network comprises executable instruction code on a digital computing machine.

7. The device of claim 5 wherein at least one unit of said neural network acts according to a noisy-OR function.

8. The device of claim 7, further including means for storing a contribution to the activation probability of said at least one unit, such that said contribution may be accessed on a plurality of activation cycles.

9. The device of claim 8 wherein said contribution is a sum over each inactive child unit of a negative logarithm of a quantity representing one minus the weight from said at least one unit to said inactive child unit.

10. The device of claim 5 wherein said assigner means is configured to perform a soft segmentation of said input signal to obtain said parts.

11. The device of claim 2 wherein said memory means is a lossless storage device.

12. The device of claim 11 wherein each of said parts is a difference vector representing a difference between said input signal and a previously stored comparison pattern represented by said retrieval signal.

13. The device of claim 12 wherein said assigner means is configured to assign each of said parts to a winning feature detector, said winning feature detector having the preferred feature which has a minimum distance from said difference vector.

14. The device of claim 2 wherein said updater means is configured to modify each of said responsible feature detectors so as to make its preferred feature move to a new input space location which is substantially along the vector from its current input space location to the input space location of its assigned part.

15. A method for creating a pattern recognition device, comprising the steps of:

(a) providing transducer means for producing an input signal representing a physical pattern in an environment;

(b) providing a plurality of feature detectors responsive to said input signal, each feature detector having weight means for storing a representation of a preferred feature, for producing a feature activity signal representing degrees to which each of said preferred features exists in said input signal, and for producing a feature description signal representing said preferred features;

(c) providing classifier means responsive to said feature activity signal, for producing an output signal representing a system action corresponding to said input signal;

(d) providing effector means responsive to said output signal, for committing an action in said environment;

(e) providing memory means for approximately storing input patterns, and for producing a retrieval signal representing previously stored input patterns;

(f) using said memory means to approximately store a sequence of comparison patterns;

(g) providing a training pattern;

(h) identifying a plurality of parts in said training pattern, such that each part corresponds to a likely feature of said training pattern and of said comparison patterns;

(i) assigning each of said parts to a corresponding responsible feature detector;

(j) modifying each of said responsible feature detectors so as to make its preferred feature substantially directly more similar to its assigned part;

(k) training said feature detectors by repeating steps (g) through (j) on a significant portion of a training set until a training criterion is reached;

whereby the modification of each of said responsible feature detectors is largely independent of the modifications of the other feature detectors;

whereby said method allows effective creation of a pattern recognition device with fewer pattern presentations than a device having correlated feature training.

16. The method of claim 15, further including the steps of:

(l) repeating steps (a) through (d) to create a comparable pattern recognition device;

(m) transferring the preferred feature of at least one of the trained feature detectors to at least one corresponding feature detector of said comparable pattern recognition device.

17. The method of claim 15 wherein said memory means is responsive to said feature activity signal and to said feature description signal, and said retrieval signal is dependent upon said feature activity signal and upon said feature description signal.

18. The method of claim 17 wherein said feature detectors are implemented with a neural network, such that the weight means for each feature detector comprises an array of modifiable connections configured for receiving said input signal.

19. The method of claim 18 wherein at least one unit of said neural network acts according to a noisy-OR function.

20. A device for recognizing and responding to physical patterns, comprising:
- (a) a transducer capable of producing an input signal representing a physical pattern in an environment;
- (b) a plurality of feature detectors each responsive to said input signal, each feature detector having weight storage capable of representing a preferred feature, each of said feature detectors being capable of producing a feature activity signal element representing a degree to which its preferred feature exists in said input signal, and being capable of producing a feature description signal element representing its preferred feature;
- (c) a classifier responsive to each said feature activity signal element, capable of producing an output signal representing a system action corresponding to said input signal;
- (d) an effector responsive to said output signal, capable of committing an action in said environment;
- (e) a memory responsive to said input signal, capable of approximately storing a representation of said input signal, and capable of producing a retrieval signal representing previously stored input signals;
- (f) an assigner responsive to said input signal and to said retrieval signal and to each of said feature description signal elements, capable of producing a part mapping signal representing a mapping between a plurality of parts and a plurality of responsible feature detectors, such that each part corresponds to a likely feature of said input signal and of said previously stored input signals, and such that each responsible feature detector has a high correspondence to its assigned part relative to the other feature detectors;
- (g) an updater responsive to said part mapping signal, capable of modifying each of said responsible feature detectors so as to make its preferred feature vector move substantially directly toward its assigned part vector;

whereby the modification of each of said responsible feature detectors is largely independent of the modifications of the other feature detectors;

whereby said device can be effectively trained with fewer physical pattern examples than a device having correlated feature training.

* * * * *